United States Patent
Tagawa et al.

(10) Patent No.: US 8,983,701 B2
(45) Date of Patent: Mar. 17, 2015

(54) DRIVE CONTROL APPARATUS FOR PROVIDING DRIVE CONTROL TO A HYBRID ELECTRIC VEHICLE, AND HYBRID ELECTRIC VEHICLE

(75) Inventors: Masaaki Tagawa, Shizuoka (JP); Yoshiki Ito, Shizuoka (JP); Masakazu Saito, Shizuoka (JP); Hitoshi Ohkuma, Shizuoka (JP); Yukihiro Hosoe, Shizuoka (JP)

(73) Assignee: Suzuki Motor Corporation, Shizuoka (JP)

(*) Notice: Subject to any disclaimer, the term of this patent is extended or adjusted under 35 U.S.C. 154(b) by 0 days.

(21) Appl. No.: 13/983,530

(22) PCT Filed: Feb. 16, 2011

(86) PCT No.: PCT/JP2011/000853
§ 371 (c)(1),
(2), (4) Date: Aug. 2, 2013

(87) PCT Pub. No.: WO2012/111040
PCT Pub. Date: Aug. 23, 2012

(65) Prior Publication Data
US 2013/0311029 A1 Nov. 21, 2013

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
(Continued)

(52) U.S. Cl.
CPC .............. *B60W 20/108* (2013.01); *B60K 6/445* (2013.01); *B60W 10/06* (2013.01); *B60W 10/08* (2013.01);
(Continued)

(58) Field of Classification Search
CPC .......... B60W 20/00; B60W 2510/638; B60W 2510/657; B60W 10/08
USPC ....................................... 701/22; 180/65.265
See application file for complete search history.

(56) References Cited

U.S. PATENT DOCUMENTS

2005/0266957 A1* 12/2005 Kamijo et al. .................... 477/3

FOREIGN PATENT DOCUMENTS

| JP | 2001-123857 A | 5/2001 |
| JP | 2005-45863 A | 2/2005 |

(Continued)

OTHER PUBLICATIONS
International Search Report mailed May 24, 2011 in PCT/JP2011/000853.

*Primary Examiner* — Imran Mustafa
(74) *Attorney, Agent, or Firm* — Rothwell, Figg, Ernst & Manbeck, P.C.

(57) ABSTRACT

An upper rotational speed limit NengUL and a lower rotational speed limit NengLL of an engine operation prohibition area are set from an upper rotational speed limit Nmg2UL and a lower rotational speed limit Nmg2LL of a motor operation predetermined prohibition area of a second motor generator. When an engine speed target Nengt, calculated from a preset target operating line, lies in the engine operation prohibition area, the engine operating point target is corrected so that the second motor generator rotational speed target Nmg2t lies outside the motor operation prohibition area. When the engine speed target Nengt is greater than or equal to a change-direction engine speed NengCD at which direction of shift to/from an allowable range of engine operation is changed, the engine speed Neng is increased. When the engine speed target Nengt is less than the change-direction engine speed NengCD, the engine speed Neng is decreased.

11 Claims, 17 Drawing Sheets

(51) Int. Cl.
*G06F 17/00* (2006.01)
*B60W 10/00* (2006.01)
*B60W 20/00* (2006.01)
*B60K 6/445* (2007.10)
*B60W 10/06* (2006.01)
*B60W 10/08* (2006.01)
*B60W 30/20* (2006.01)

(52) U.S. Cl.
CPC ............... *B60W 20/00* (2013.01); *B60W 30/20* (2013.01); *Y02T 10/6286* (2013.01); *Y02T 10/6239* (2013.01); *B60W 2710/0644* (2013.01); *B60W 2710/081* (2013.01); *B60W 2600/00* (2013.01); *Y10S 903/93* (2013.01)
USPC .......................... 701/22; 180/65.265; 903/930

(56) References Cited

FOREIGN PATENT DOCUMENTS

| | | |
|---|---|---|
| JP | 2006-67665 A | 3/2006 |
| JP | 2006-187169 A | 7/2006 |
| JP | 2006187169 A * | 7/2006 |
| JP | 3852562 B2 | 11/2006 |
| JP | 2007-131103 A | 5/2007 |
| JP | 2008-12992 A | 1/2008 |
| JP | 2008-179292 A | 8/2008 |
| JP | 2008-265599 A | 11/2008 |
| JP | 2009-220788 A | 10/2009 |

* cited by examiner

DRIVE CONTROL APPARATUS FOR PROVIDING DRIVE CONTROL TO A HYBRID ELECTRIC VEHICLE, AND HYBRID ELECTRIC VEHICLE

CROSS REFERENCE TO RELATED APPLICATION

This application is a 35 U.S.C. 371 National Phase Entry Application from PCT/JP2011/000853, filed Feb. 16, 2011, the disclosure of which is incorporated herein in its entirety by reference.

TECHNICAL FIELD

The present invention relates to a drive control apparatus for a hybrid electric vehicle including an engine and a motor generator, as power sources. More particularly, the present invention relates to a drive control apparatus suitable for controlling the power sources in such a way that achieves a drive torque at a given target.

BACKGROUND ART

For example, Patent Literature 1 listed below describes one of hybrid electric vehicles including a motor generator, as another power source, other than an engine. In the hybrid electric vehicle disclosed in this Patent Literature 1, if operating conditions, such as, a vehicle speed, are fulfilled, driving the vehicle only by the motor generator, with the engine halted, improves fuel efficiency. A hybrid electric vehicle described in Patent Literature 2 listed below lowers a battery charge level immediately before starting the vehicle on an uphill incline to avoid battery overcharge when electricity is generated by a motor driven by large engine torque upon start on the uphill incline.

Patent Literature 3 listed below discloses one approach to address torque ripple such as cogging torque in a motor used in a hybrid electric vehicle. Therefore, Patent Literature 4 listed below describes the art to restrain and prevent vehicle vibration by controlling operating conditions of two motors when the vehicle vibration is due to cogging torque.

PRIOR ART

Patent Literatures

Patent literature 1: JP-A 2007-131103
Patent literature 2: JP-A 2009-220788
Patent literature 3: JP-A 2006-67665
Patent literature 4: JP-A 2008-265599

SUMMARY OF INVENTION

Problem to be Solved by Invention

According to said Patent Literature 4, vibration of a hybrid electric vehicle due to cogging torque may be restrained and prevented by controlling the operating conditions of two motors. However, in the hybrid electric vehicle equipped with a power split and composition device having four shafts connecting to motor, engine, a traction shaft connected to traction wheel and the other motor in this order on the collinear diagram, there is a problem that the vehicle vibration may take place due to torque ripple at a predetermined vehicle speed when the rotational speed of one of the motors lies in the neighborhood of 0 rpm in a drive mode in which the motor is activated with the engine in operation.

The present invention addresses the above-mentioned problem. An object of the present invention is to provide a drive control apparatus for a hybrid electric vehicle capable of restraining and preventing the vehicle vibration due to torque ripple when rotational speed of a motor lies in the neighborhood of 0 rpm in an engine drive mode.

Means to Solve Problem

In order to solve the above-mentioned problem, there is provided, according to one aspect of the present invention, a drive control apparatus for a hybrid electric vehicle, which is driven, via a powertrain, by using the output of an engine and the output of a motor operable on power supplied by a battery, characterized by comprising: a drive control function configured to correct an engine operating point target defined by an engine speed target and an engine torque target in such a way that, when the rotational speed of said motor comes to lie in a prohibition area of motor operation that is a predetermined range in the neighborhood of 0 rpm of the rotational speed of said motor while driving the vehicle by controlling operating conditions of said engine and motor, the rotational speed of the motor lies outside the area.

Further, upon determining that an engine speed target, which is calculated from a preset target operating line after setting a rotational speed upper limit and a rotational speed lower limit of a prohibition area of engine operation from a rotational speed upper limit and a rotational speed lower limit of said prohibition area of motor operation, lies in said prohibition area of engine operation, said drive control function corrects the engine operating point target in such a way that the rotational speed target of said motor lies outside said prohibition area of motor operation.

Further, in the event that said engine operating point target is corrected, said drive control function corrects said engine operating point target in such a way that said engine operating point gets closer to said target operating line preset to improve efficiency of said engine and efficiency of said powertrain.

Further, in the event that said engine operating point target is corrected, upon determining that input/output power of the battery is out of a permissible range variable depending on the state of charge of the battery after determining whether or not the input/output power of the battery is in the permissible range, said drive control function sets the engine torque target in such a way that the input/output power of the battery lies in the permissible range of input/output power of said battery.

Further, said drive control function corrects the engine speed target, after setting, between the rotational speed upper and lower limits of said prohibition area of engine operation, a change-direction engine speed at which direction of shift is changed toward the adjacent allowable area of engine operation, in a direction of increasing engine speed in the event that said engine speed target is greater than or equal to the change-direction engine speed or in a direction of decreasing engine speed in the event that said engine speed target is less than the change-direction engine speed.

Further, said drive control function, which varies the engine speed target in such a way as not to exceed a limited amount of change set beforehand, provides a setting that a value of the limited amount of change used when said motor speed passes said prohibition area of motor operation is greater than a value of the limited amount of change used otherwise.

Further, there is a power split and composition device with four shafts in driving connection with rotating elements of each of two planetary gear sets;

said motor and another motor are coupled to the battery; and said four shafts of the power split and composition device are connected to said another motor, said engine, a traction shaft connected to a traction wheel and said motor, respectively, so that said another motor, said engine, said traction shaft and said motor are arranged in this order on a collinear diagram from one side thereof. Said drive control function controls operating conditions of said engine in response to an engine power target derived from a driving power target required for the vehicle, and at the same time, controls operating conditions of said motor and the another motor in response to a charge/discharge power target calculated by subtracting engine power target from said driving power target.

Effect of Invention

Thus, according to the one aspect of the invention, for the control of operating conditions of an engine and a motor, an engine operating point target defined by an engine speed target and an engine torque target is corrected in such a way that, when the rotational speed of said motor comes to lie in a prohibition area of motor operation that is a predetermined range in the neighborhood of 0 rpm of the rotational speed of the motor while driving the vehicle, the rotational speed of the motor lies outside the area. This restrains and prevents a situation where torque ripple takes place at rotating speeds of motor in the neighborhood of 0 rpm, making it possible to restrain and prevent vehicle vibration due to such torque ripple.

Further, upon determining that an engine speed target, which is calculated from a preset target operating line after setting an upper rotational speed limit and a lower rotational speed limit of a prohibition area of engine operation from an upper rotational speed limit and a lower rotational speed limit of a predetermined prohibition area of motor operation, lies in said prohibition area of engine operation, the engine operating point target is corrected in such a way that the rotational speed target of motor lies outside the prohibition area of motor operation. Therefore, regardless of operating condition required for the motor, it is possible to restrain and prevent vehicle vibration due to motor torque ripple.

Further, in the event that the engine operating point target is corrected, the engine operating point target corrected in such a way that the engine operating point gets closer to a target operating line preset to improve efficiency of engine and efficiency of powertrain. Therefore, it is possible to restrain and prevent vehicle vibration due to motor torque ripple without any deterioration of fuel efficiency.

Further, in the event that the engine operating point target is corrected, upon determining that input/output power of the battery is out of a permissible range variable depending on the state of charge of the battery after determining whether or not the input/output power of the battery is in the permissible range, the engine torque target is set in such a way that the input/output power of the battery lies in the permissible range of input/output power of the battery. Therefore, it is possible to restrain and prevent vehicle vibration due to motor torque ripple with input/output power of the battery maintained appropriately.

Further, the engine speed target is corrected, after setting, between the upper speed limit and lower speed limit of the prohibition area of engine operation, a change-direction engine speed at which direction of shift to and from an allowable range of engine operation is changed, in a direction of increasing engine speed in the event that the engine speed target is greater than or equal to the change-direction engine speed or in a direction of decreasing engine speed in the event that the engine speed target is less than the change-direction engine speed. Therefore, this correction makes it possible to give an engine speed target near an engine speed target calculated from the target operating line.

Further, the engine speed target is varied in such a way as not to exceed a limited amount of change set beforehand, and a value of the limited amount of change used when the motor speed passes the prohibition area of motor operation is made greater than a value of the limited amount of change used otherwise.

Therefore, this makes it possible for the motor speed to pass through the prohibition area of motor operation in a short period of time while restraining rapid change of engine speed.

Further, there is a power split and composition device with four shafts in driving connection with rotating elements of each of two planetary gear sets. The motor and another motor are coupled to the battery. The four shafts of the power split and composition device are connected to another motor, the engine, a traction shaft connected to a traction wheel and the motor, respectively, so that the another motor, the engine, the traction shaft and the motor are arranged in this order on a collinear diagram from one side thereof. Operating conditions of the engine are controlled in response to an engine power target, and at the same time, operating conditions of the motor and the another motor are controlled in response to a charge/discharge power target calculated by subtracting engine power target from the driving power target. Therefore, there is provided a simple and compact hybrid system with high efficiency and low energy loss.

DESCRIPTION OF EMBODIMENT(S)

Referring, next, to the drawings, one embodiment of a drive control apparatus for providing a drive control to a hybrid electric vehicle according to the present invention is described.

Figure 1:
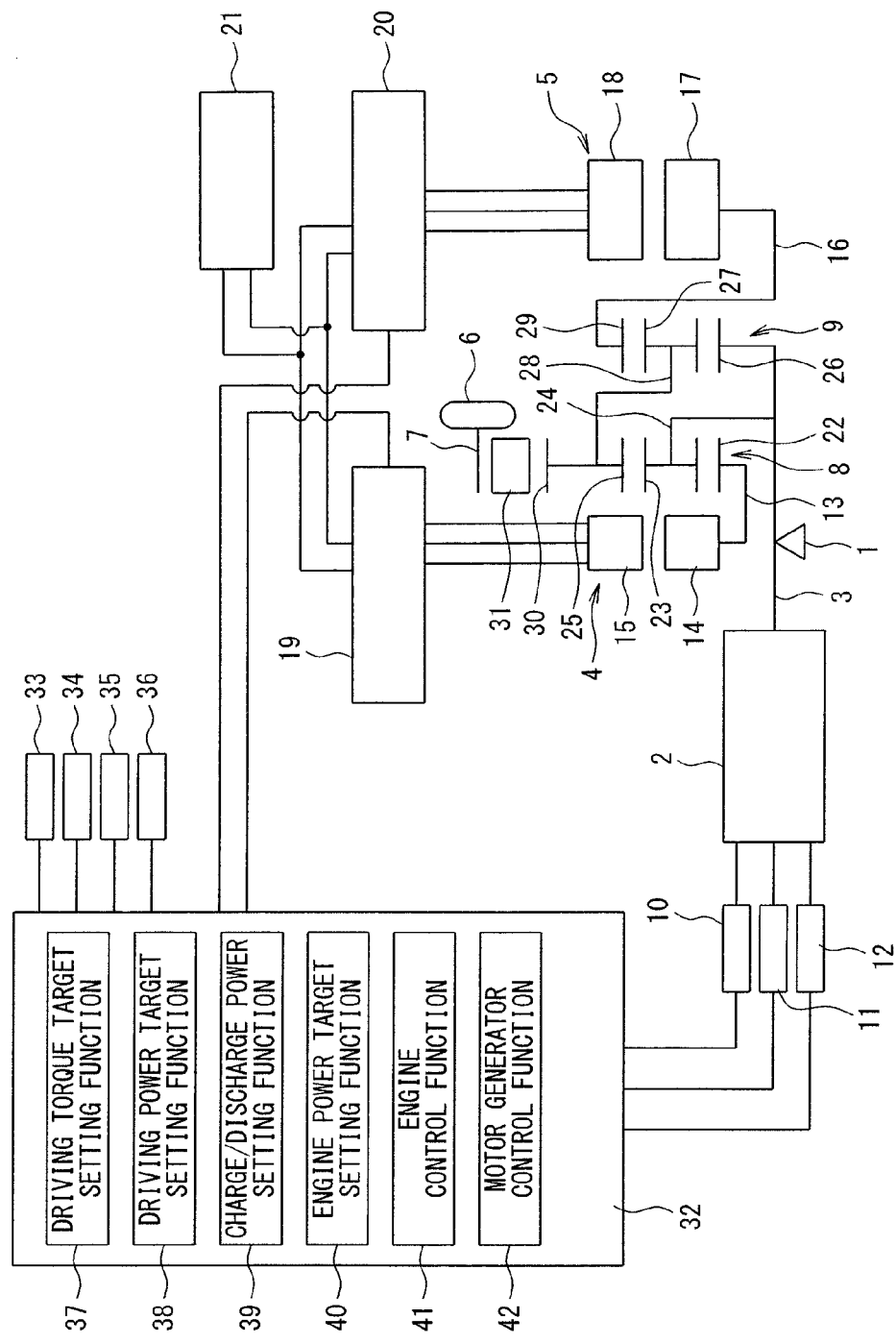
FIG. 1 is a system configuration diagram, showing one embodiment of a drive control apparatus for providing drive control to a hybrid electric vehicle according to the present invention.

FIG. 1 shows a system configuration diagram showing the embodiment of drive control apparatus for providing drive control to a hybrid electric vehicle according to the present invention. The hybrid electric vehicle according to this embodiment includes, as its powertrain, an engine 2 configured to deliver engine power by providing internal combustion of fuel, a first motor generator (or a motor) 4 and a second motor generator (or a motor) 5, each being configured to deliver power by receiving electric energy (in a motor drive mode) or generate electric energy in a regenerative mode, a traction shaft 7 connected to a traction wheel 6 of the vehicle, a first planetary gear set 8 and a second planetary gear set 9, which provide a power split and composition device that composes or splits driving power delivered from said engine 2, the first and second motor generators 4 and 5 and the ground reaction that is delivered from the traction wheels 6, and an output gearing 31 that provides a drive connection between the power split and composition device and the traction shaft 7.

Engine 2 includes: a mass air flow adjustment unit 10, like a throttle valve, configured to adjust conditions of intake air in response to the position of an accelerator pedal that is not illustrated; a fuel admission system 11, like a fuel injection system, configured to adjust conditions of admission of fuel in response to the conditions of intake air; and an ignition manager 12, like an ignition system, configured to adjust conditions of igniting fuel. Accordingly, combustion of fuel in engine 2 may be controlled by coordinating the conditions of intake air by operating the mass air flow adjustment unit 10, conditions of injection fuel by operating the fuel admission system 11 and conditions of igniting fuel by operating the ignition manager 12, resulting in modulation of drive power from the engine 2, specifically modulation of rotational speed and torque, which may be hereinafter described also as engine speed and engine torque. A one-way clutch 1 is provided, as an engine revolution restricting device, to allow the engine output shaft 3 of engine 2 to rotate in one direction only and regulate its rotation in the opposite direction.

First motor generator 4 has a first rotor shaft 13, a first rotor 14 and a first stator 15. Second motor generator 5 has a second rotor shaft 16, a second rotor 17 and a second stator 18. First stator 15 of first motor generator 4 is electrically coupled to a first inverter 19, and second stator 18 of second motor generator 5 is electrically coupled to a second inverter 20. First and second inverters 19 and 20 are electrically coupled to a battery 21. First and second inverters 19 and 20 adjust electrical energy delivered from the battery 21 to first and second stators 15 and 18 via adjusting, for example, field current so as to adjust motor power from first motor generator 4 and motor power from second motor generator 5, specifically, rotational speed and driving torque (which may be hereinafter described also as motor-generator rotational speed and motor-generator torque). Moreover, each of first and second motor generators 4 and 5 is operable in regenerative mode to generate electricity when torque is directed in a direction opposite to a direction of rotation, so that the generated electrical energy may be used to charge the battery 21.

First planetary gear set 8, as is well known in the art, includes a first sun gear 22, a first carrier 24, which carries first planetary gears 23, and a first ring gear 25. Second planetary gear set 9 includes a second sun gear 26, a second carrier 28, which carries second planetary gears 27, and a second ring gear 29. In this embodiment, the engine 2, first motor generator 4, second motor generator 5, first planetary gear set 8 and second planetary gear set 9 are all disposed on the same axis. First carrier 24 of first planetary gear set 8 and second sun gear 26 of second planetary gear set 9 are coupled together and connected drivably to the engine output shaft 3 of engine 2. First sun gear 22 of first planetary gear set 8 is connected drivably to first rotor shaft 13 of first motor generator 4, and second ring gear 29 of second planetary gear set 9 is connected drivably to second rotor shaft 16 of second motor generator 5. First ring gear 25 of first planetary gear set 8 and second carrier 28 of second planetary gear set 9 are coupled together and connected to traction shaft 7 for traction wheel 6. Drive connection to traction shaft 7 is accomplished by connecting an output portion 30 such as a gear formed on the outer circumference of first ring gear 25 of first planetary gear set 8 to traction shaft 7 with output gearing 31. Drive connection of each of a portion of rotating elements of first planetary gear set 8 to the corresponding one of rotating elements of second planetary gear set 9 is accomplished directly without any power transmitting gear between them, and drive connection of each of the remainder of the rotating elements to the corresponding one of first motor generator 4, second motor generator 5 and engine 2 is accomplished similarly.

Mass air flow adjustment unit 10 to adjust conditions of intake air entering said engine 2, fuel admission system 11 to adjust conditions of admission of fuel, ignition manager 12 to adjust conditions of igniting fuel, first inverter 19 to adjust electrical energy to first stator 15 of first motor generator 4, second inverter 20 to adjust electrical energy to second stator 18 of second motor generator 5 are connected to drive-control controller (drive control function) 32. The drive-control controller 32 is composed of: a driving torque target setting function 37 to set driving torque needed for propelling the vehicle; a driving power target setting function 38 to set a driving power target to obtain drive torque with the vehicle travelling at a vehicle speed; a charge/discharge power target setting function 39 to set a charge/discharge power to said battery 21 judging from the state of charge of battery 21; an engine power target setting function 40 to set an engine power target to obtain a driving power target while achieving the charge/discharge power target; an engine control function 41 to set an efficient engine speed and engine torque in response to the engine power target; and a motor generator control function 42 to control first inverter 19 and second inverter 20 so that the total electricity of first motor generator 4 and second motor generator 5 becomes the charge/discharge power target. The drive-control controller 32 is composed of processor controller like microcomputer, and said setting functions and control functions are built by data processing performed in said drive-control controller 32.

The vehicle includes: an accelerator pedal position sensor 33 configured to detect the position of an accelerator pedal as an accelerator position Acc; a driving speed sensor 34 configured to detect a vehicle speed Vc; an engine speed sensor 35 configured to detect the rotational speed of the engine 2 as an engine speed Neng; and a battery state of charge sensor 36 configured to detect the amount of electrical energy SOC in the battery 21. The drive-control controller 32 reads the detected signals from these sensors and controls operating conditions of engine 2, first and second motor generators 4 and 5 by coordinating mass air flow adjustment unit 10, fuel admission system 11, ignition manager 12, and first and second inverters 19 and 20 in accordance with routine described later.

As described before, according to the present embodiment, first carrier 24 of first planetary gear set 8 and second sun gear 26 of second planetary gear set 9 are directly coupled together, and first ring gear 25 of first planetary gear set 8 and second carrier 28 of second planetary gear set 9 are directly coupled together. Therefore, first carrier 24 and second sun gear 26 turn at the same speed on collinear diagrams for two planetary gear sets 8 and 9, and first ring gear 25 and second carrier 28 turn at the same speed, too. Now, overlaying the two collinear diagrams for planetary gear sets 8 and 9 makes a collinear diagram, shown in FIG. 2, which has four vertical axes in total as four rotating elements, that is, from the left, an axis for first sun gear 22 of first planetary gear set 8 (an axis labeled "MG1" in FIG. 2: the first sun gear 22 being equivalent to first rotor shaft 13 of first motor generator 4), an axis for first carrier 24 of first planetary gear set 8 and second sun gear 26 of second planetary gear set 9 (an axis labeled "ENG" in FIG. 2: the first carrier 24 and second sun gear 26 being equivalent to the engine output shaft 3 of engine 2), an axis for first ring gear 25 of first planetary gear set 8 and second carrier 28 of second planetary gear set 9 (an axis labeled "OUT" in FIG. 2: first ring gear 25 and second carrier 28 being equivalent to output portion 30 of first ring gear 25, i.e. the traction shaft 7 for traction wheel 6), and an axis for second ring gear 29 of second planetary gear set 9 (an axis labeled "MG2" in FIG. 2: the second ring gear 29 being equivalent to second rotor shaft 16 of second motor generator 5). Then, a lever ratio indicative of the relation among the distances, each between the adjacent two of the vertical axes is found: assuming that the distance between the axes ENG and OUT is 1, the distance between the axes ENG and MG1 takes on the value k1 which results from dividing the number of teeth of first ring gear 25 of first planetary gear set 8 by the number of teeth of first sun gear 22, the distance between the axes OUT and MG2 takes on the value k2 which results from dividing the number of teeth of second sun gear 26 of second planetary gear set 9 by the number of teeth of second ring gear 29.

This collinear diagram for the power split and composition device is equivalent to what is previously proposed by the present applicant in JP Patent No. 3852562. The characteristic of the power split and composition system is that the first motor generator 4 and the second motor generator 5 are located on one and the other points where the remotest two of the four vertical axes are. The relation in which the first and second motor generators 4 and 5 are placed on where the remotest two of the four vertical axes are provides not only, as mentioned in above-mentioned JP Patent, a configuration free from disadvantages such as an increase in number of parts, an increase in size of system, an increase of mechanical loss and so forth, but also, as will be described later, a reduction in the magnitude of an exchange of electrical energy during driving in ordinary situations with a high gear ratio, which in turn improves fuel efficiency.

Hereinafter, referring to several collinear diagrams, relations between speed and torque of the engine 2, travelling speed of the vehicle, speed and torque of the first and second motor generator 4 and 5 are described. In each of the collinear diagrams, Tmg1 is the first motor-generator torque provided by first rotor shaft 13 of first motor generator 4, Tmg2 is the second motor-generator torque by second rotor shaft 16 of second motor generator 5, Teng is the engine torque by the engine output shaft 3 of engine 2, Tout is the output drive torque from the output portion 30, i.e. the drive torque delivered to the traction shaft 7. In each of the collinear diagrams, it is defined that the rotational speed has a positive direction when the direction is the same as that of the engine 2 and the torque, as an input along each of the four axes, has a positive direction when the direction is the same as that of the engine torque Teng. Therefore, the drive torque Tout from the output portion 30 moves the vehicle backward when it has a positive direction and forward when it has a negative direction. It is hereinafter assumed that no mechanical, electrical and physical losses take place in the following description.

Figure 2:
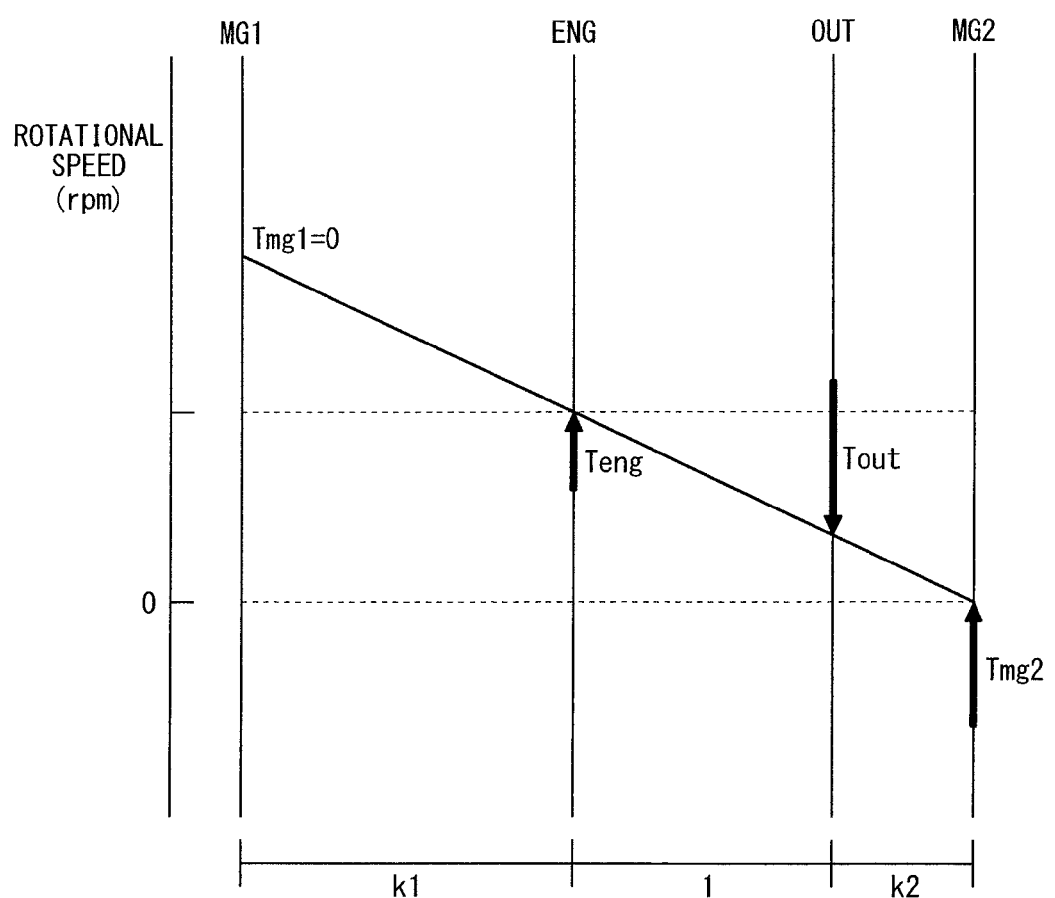
FIG. 2 is a collinear diagram for a power split and composition device in FIG. 1.

FIG. 2 represents a low-speed drive state in which the vehicle speed Vc is relatively low and the engine (ENG) 2 turns in a positive rotational direction to provide a positive engine torque Teng. Although first motor generator (MG1) 4 turns in the positive rotational direction at a high speed, the first motor-generator torque Tmg1 remains 0. Although second motor generator (MG2) 5 provides a positive second motor-generator torque Tmg2, second motor generator (MG2) 5 does not consume electrical power because the second motor-generator rotational speed Nmg2 is 0 (operation outside motoring mode). In this case, since a ratio of engine speed Neng of the engine 2 to rotational speed of the output portion 30, i.e., vehicle speed Vc, called "a gear ratio," is expressed as $(1+k2)/k2$, a state of low gear ratio is established because the transmission ratio is greater than 1.

Figure 3:
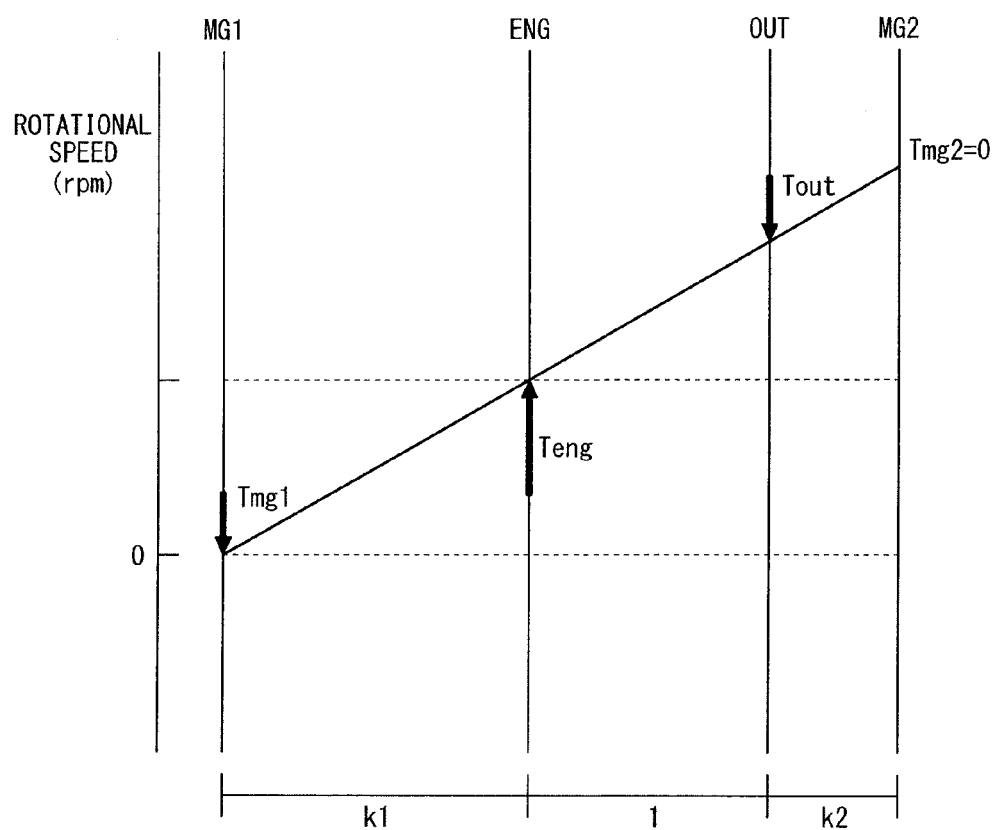
FIG. 3 is a collinear diagram for the power split and composition device in FIG. 1.

FIG. 3 represents a high-speed drive state in which the vehicle speed Vc is relatively high and the engine 2 turns in the positive rotational direction to provide a positive engine torque Teng. Although first motor generator (MG1) 4 provides a negative first motor-generator torque Tmg1, first motor-generator (MG1) 4 does not generate electrical power because the first motor-generator rotational speed is 0 (operation outside regenerating mode). Although second motor generator (MG2) 5 turns in the positive rotational direction at a high speed, the second motor-generator torque Tmg2 remains 0. In this case, since a ratio of engine speed Neng of the engine 2 to rotational speed of the output portion 30, i.e., vehicle speed Vc, called "a gear ratio," is expressed as $k1/(1+k1)$, a state of high gear ratio is established because the transmission ratio is less than 1.

Figure 4:
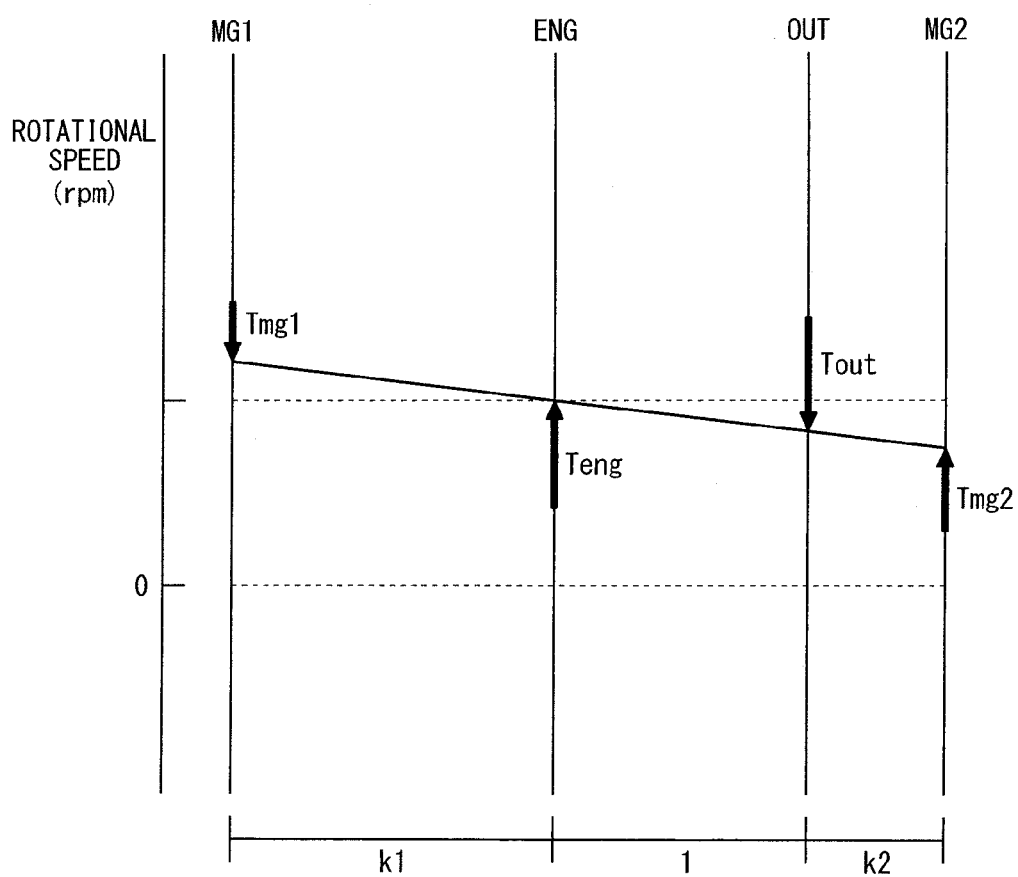
FIG. 4 is a collinear diagram for the power split and composition device in FIG. 1.

FIG. 4 represents, for example, in the illustrated state, a middle-speed drive state, which corresponds to a state of intermediate gear ratio between the low gear ratio state of FIG. 2 and high gear ratio state of FIG. 3, in which the vehicle speed Vc is middle and the engine 2 turns in a positive rotational direction to provide a positive engine torque Teng. First motor generator 4 turns in a positive rotational direction to provide a negative first motor-generator torque Tmg1. First motor generator 4 in fact generates electrical power (operation in generating mode). On the other hand, second motor generator 5 generates a positive second motor-generator torque Tmg2 though it turns in a positive rotational direction. Second motor generator 5 in fact is consuming electrical power (operation in motoring mode). When there is no charge to or discharge from the battery 21, an exchange of electrical energy may be nicely balanced by powering second motor generator 5 with electrical power generated by first motor generator 4.

Thus, it is possible for the power split and composition device according to the present embodiment to provide a suitable drive torque Tout to any one of various operating conditions of the engine by controlling the first and second motor generators 4 and 5 over a wide speed range from low speed to high speed. In principle, the hybrid electric vehicle according to this embodiment in fact does not need any transmission. Moreover, it is possible to drive the vehicle backward even when the engine 2 keeps running. It is also possible to drive the vehicle forward or backward with only both or one of first motor generator 4 and second motor generator 5 after halting the engine 2.

Figure 5:
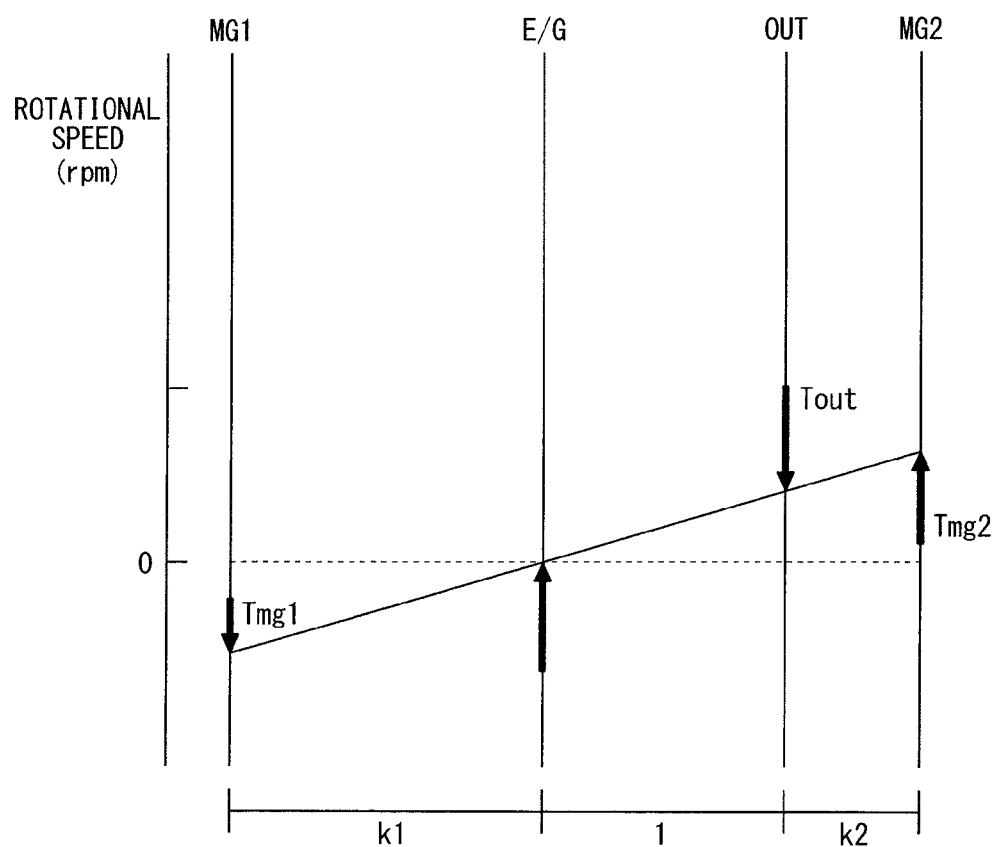
FIG. 5 is a collinear diagram for the power split and composition device in FIG. 1.
Figure 6:
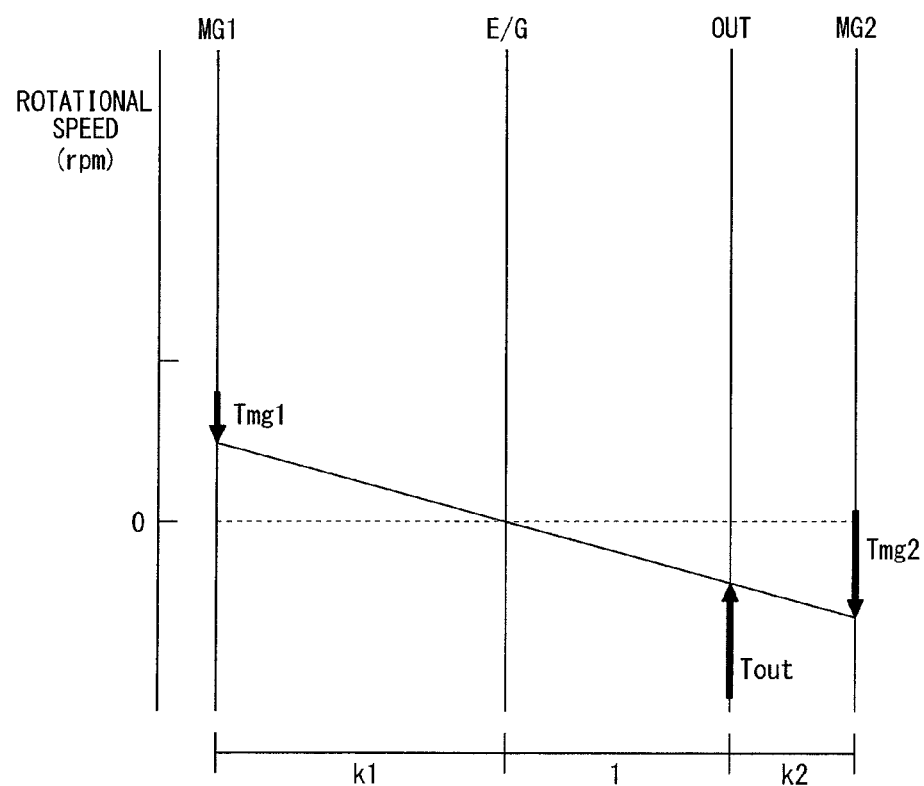
FIG. 6 is a collinear diagram for the power split and composition device in FIG. 1.

FIG. 5 is a collinear diagram representing forward driving of the vehicle when engine 2 stops by operating only one or both of first and second motor generators 4 and 5. In this case, as JP Patent No. 3852562 describes, the rotational speed of engine 2 should remain 0 so that if torque is imparted to the engine output shaft 3 in the negative direction, this torque would be received by a one-way clutch 1. FIG. 6 is a collinear diagram representing backward driving of vehicle when engine 2 stops by operating one or both of first and second motor generators 4 and 5. During forward or backward driving by operating only one or both of first and second motor generators 4 and 5, basically operating second motor generator 5 only may provide a sufficient drive torque for forward or backward driving because engine speed Neng is 0. However, in this case, as a characteristic of a motor, torque reduces at high vehicle speed as the motor speed increases, and there is such a case as a predetermined torque may not be reached due to reverse electromotive force. Moreover, there are cases that the vehicle may resonate due to cogging torque at extremely low vehicle speeds when the vehicle is about to stop if the vehicle is driven only by the motor generator. Therefore, the first motor generator sharing ratio "cf" is set in response to driving conditions of the vehicle and rotational speed of second motor generator 5 (second motor generator rotational speed target Nmg2t) as described later, and torque of first motor generator 4 and torque of second motor generator 5 are set and controlled in response to the first motor generator sharing ratio "cf".

As is clear from these collinear diagrams, a first motor generator rotational speed Nmg1 is given by the following formula (1) and a second motor generator rotational speed Nmg2 by the following formula (2). In each of the formulas, Neng is the engine speed, and Nout is the output rotational speed of output portion 30, in which the output rotational speed Nout is derived from the vehicle speed Vc, the final reduction ratio and the reduction ratio of output gearing 31.

$$Nmg1 = (Neng - Nout) \times k1 + Neng \qquad (1)$$

$$Nmg2 = (Nout - Neng) \times k2 + Nout \qquad (2).$$

Input torques to the planetary gear sets are balanced when the following equation (3) holds. Electrical power generated or consumed by first and second motor generators 4 and 5 is equal to input/output electrical power (charge/discharge power) Pbat to/from battery 21 when the following equation (4) holds. Rotational speeds Nmg1 and Nmg2 are indicated in rpm (revolution per minute or rotation per minute).

$$Teng + (1+k1) \times Tmg1 = k2 \times Tmg2 \qquad (3)$$

$$Nmg1 \times Tmg1 \times 2\pi/60 + Nmg2 \times Tmg2 \times 2\pi/60 = Pbat \qquad (4).$$

As later described, a method is described for setting engine speed target Nengt and engine torque target Tengt which are considered to provide efficient operation. In the present embodiment, as described in JP-A 2008-12992 in which the applicant previously made a proposal, the setting is such that, for a given engine power request, the higher the vehicle speed, the higher the engine speed target Nengt becomes and the lower the engine torque target Tengt becomes.

Figure 7:
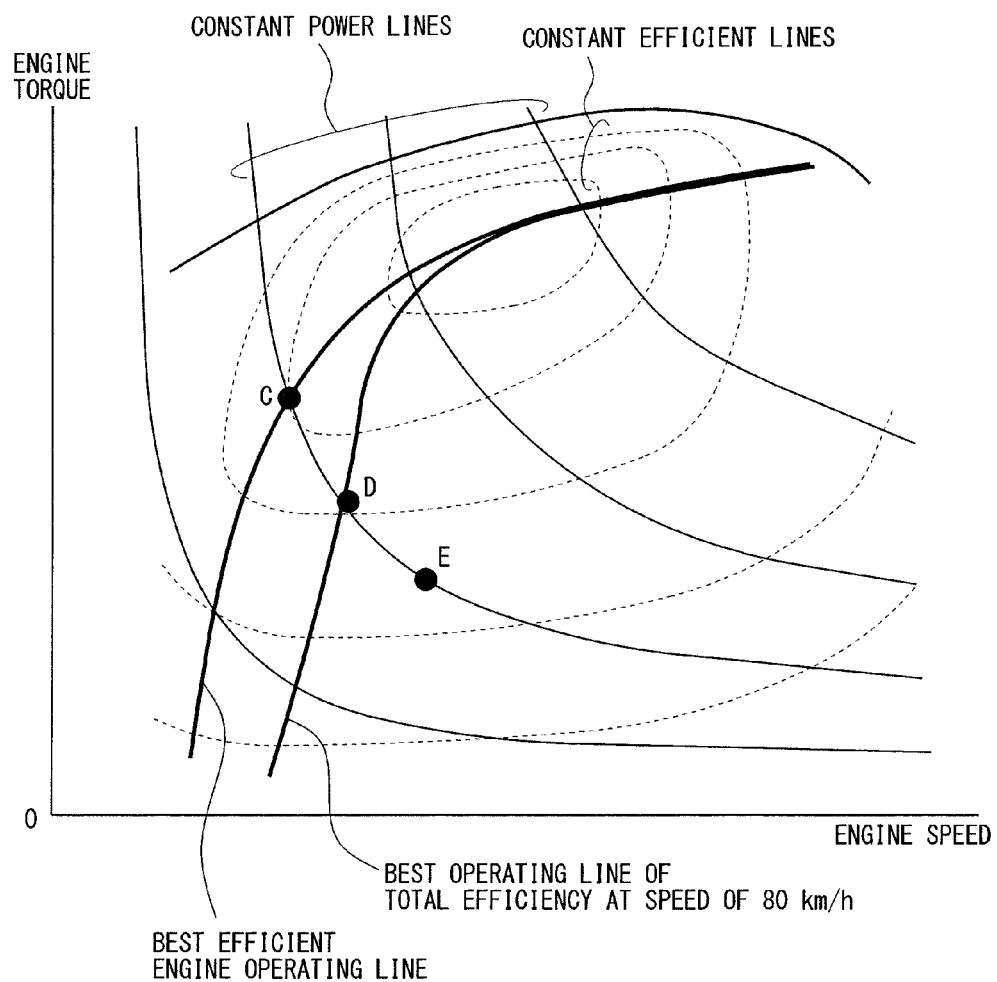
FIG. 7 is an engine characteristic diagram used to describe operating points and operating lines.

Let, for example, the horizontal axis represent engine speed and the vertical axis engine torque as shown in FIG. 7, a family of constant engine power lines takes the form of a set of inverse proportions in graphical representation because the engine power is the product of engine speed and engine torque. The engine characteristic diagram contains a family of constant efficiency lines, each interconnecting constant efficiency points provided by the engine only. If, for example, for a given engine power as a target, an engine speed and an engine torque, which constitute an operating point considered to provide the most efficient engine operation among all points on the engine power line for the given engine power, are set as an engine speed target Nengt and an engine torque target Tengt, driving with low fuel consumption caused due to at least efficient function operation of the engine may be provided. Connecting these points makes a line of best operation for engine efficiency as shown in FIG. 7. The engine speed target Nengt and engine torque target Tengt which have been set in the above mentioned example are now illustrated as an operating point C.

Figure 8:
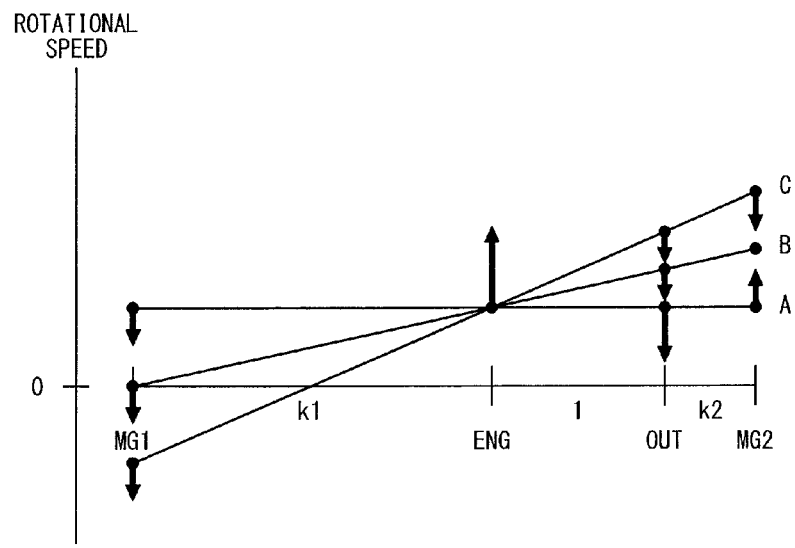
FIG. 8 is a collinear diagram for the power split and composition device in FIG. 1.

With the engine speed target Nengt and the engine torque target Tengt set in this manner and fixed, let the vehicle speed Vc, i.e. the output rotational speed Nout, vary as shown in FIG. 8. In this case, when the vehicle speed Vc is low and the output rotating speed Nout is low alike, both the first motor generator speed Nmg1 and the second motor generator speed Nmg2 are positive, while the first motor generator torque Tmg1 takes on a negative value and the second motor generator torque Tmg2 takes on a positive value, as indicated on a lever A in the collinear diagram in FIG. 8. In this case, the first motor generator 4 operates in generating mode and the second motor generator 5 in motoring mode, but they rotate in the same positive rotational direction, causing no circulation of power (motive power).

Similarly, when the vehicle speed Vc becomes a little higher (40 km/h, for example) and the output rotational speed Nout also becomes a little higher, the first motor generator rotational speed Nmg1 becomes 0, the first motor generator torque Tmg1 becomes negative, the second motor generator rotational speed Nmg2 becomes positive and the second motor generator torque Tmg2 becomes 0 as indicated on a lever B in the collinear diagram shown in FIG. 8 (the same as the state of high gear ratio shown in FIG. 3). There is no circulation of power (motive power) either in this case.

Figure 9:
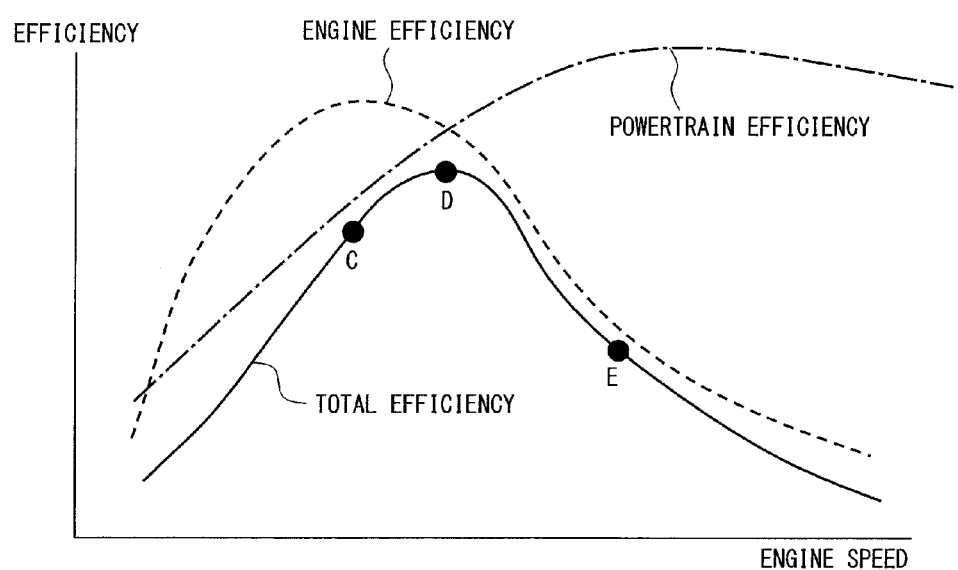
FIG. 9 is an explanatory diagram, showing the relationship between engine speed and efficiency.

However, when the vehicle speed Vc becomes still higher (80 km/h, for example) and the output rotational speed Nout becomes still higher alike, the first motor generator rotational speed Nmg1 becomes negative, the first motor generator torque Tmg1 takes on a negative value, the second motor generator rotational speed Nmg2 takes on a positive value and the second motor generator torque Tmg2 takes on a negative value as indicated on a lever C in the collinear diagram shown in FIG. 8. This state is characterized by operation of the first motor generator 4 in motoring mode in negative direction, operation of the second motor generator 5 in generating mode and circulation of power (motive power), causing a reduction in powertrain efficiency. As shown in FIG. 9, this reduction in powertrain efficiency causes a reduction in overall efficiency despite the fact that the engine efficiency is high, so that operating point C is lower in overall efficiency than operating point D.

Figure 10:
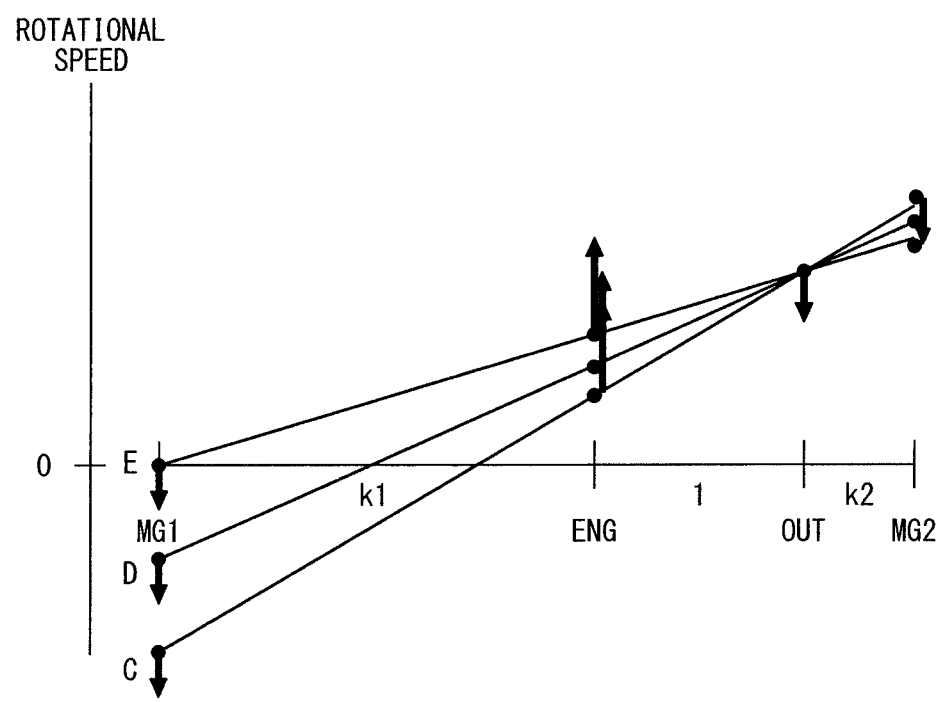
FIG. 10 is a collinear diagram for the power split and composition device in FIG. 1.

Increasing the first motor generator rotational speed Nmg1 to a level equal to or higher than 0, as indicated by a lever E in the collinear diagram shown in FIG. 10, may be considered as one approach to prevent circulation of power during driving at such high speed (80 km/h, for example) but this approach causes an increase in engine speed. Such increase in engine speed also causes a reduction in overall efficiency even though the powertrain efficiency is high as indicated at a point E in FIG. 9.

Figure 11:
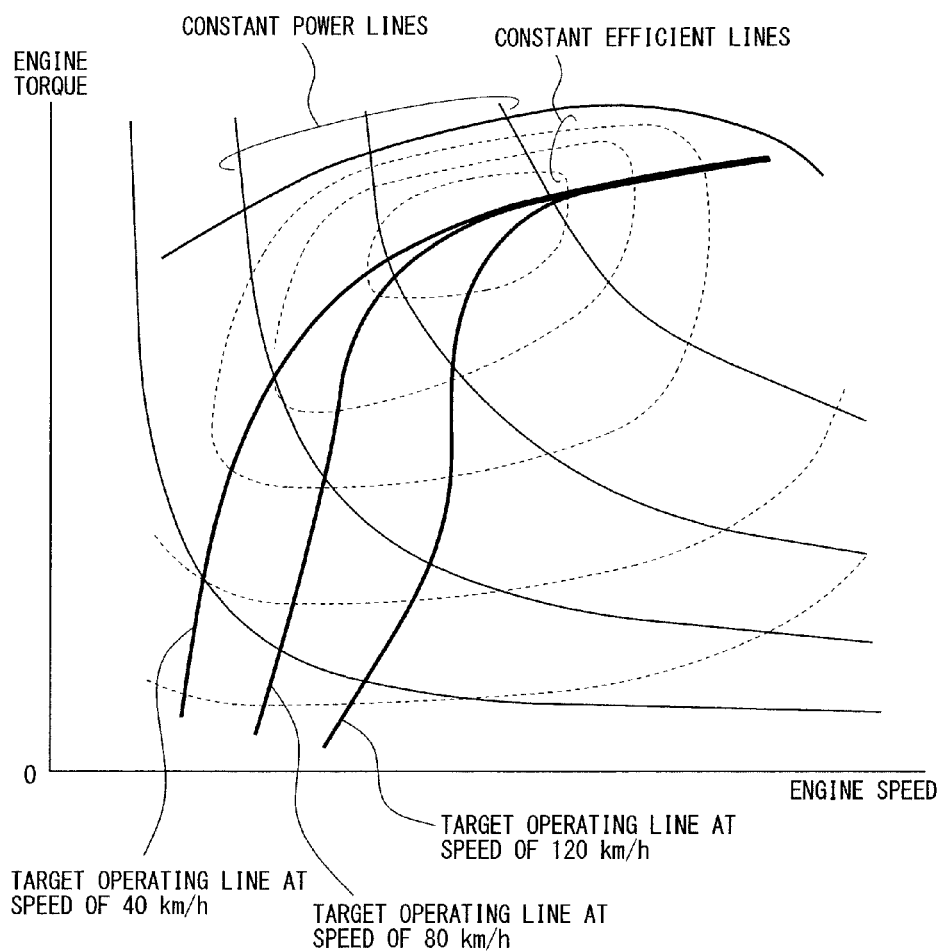
FIG. 11 is the engine characteristic diagram expressed as a control map for operating line retrieval.

Accordingly, setting the engine speed for driving at such high speed (80 km/h, for example) to a point D lying between points C and E shown in FIG. 9 (see a lever D in the collinear diagram shown in FIG. 10), as shown in FIG. 7, this engine speed at this operating point D is used as an engine speed target Nengt and an engine torque found on the constant power line for the given engine power target against the engine speed target Nengt is used as an engine torque target Nengt. For those reasons, as shown in FIG. 11, when, for example, an engine power target is given, the target operating line for the given engine power target varies in response to the vehicle speed in such a way as to provide the setting that, overall, the higher the vehicle speed Vc, the higher the engine speed target Nengt becomes and the lower the engine torque target Tengt becomes.

In the case of setting such engine speed target Nengt and engine torque target Tengt via discretization in a computer system, control outputs, i.e. engine speed target Nengt and engine torque target Tengt, are considered to change suddenly or frequently in response to a change in each of control inputs read during sampling at regular intervals, causing the engine speed and torque to change suddenly or frequently if such control outputs are actually attained in the engine 2. Thus, a so-called filter may be used to restrain the engine speed Nengt from changing suddenly and frequently by setting a limited amount of change for a change in engine speed target Nengt to limit the change in engine speed target Nengt by the limited amount of change if the limited amount of change is exceeded by the change in engine speed target Nengt. It is possible to alter the limited amount of change in engine speed target Nengt under certain circumstances.

Next, as described later in the routine, a method is described for correcting engine speed target Nengt and engine torque target Tengt upon operating at least second motor generator 5 during driving with engine 2. As described before, operating the motor in the neighborhood of 0 rpm causes torque ripple like cogging torque, and this torque ripple may cause vehicle vibration. The vehicle driver may readily feel such vehicle vibration especially at low speeds. Second motor generator 5 turns at low speeds during driving at low speeds in drive mode by engine 2. Then, as shown in FIG. 12, a range in second motor generator rotational speed Nmg2 of second motor generator 5 is set aside for a prohibition area of second motor generator operation, where Nmg2UL is a rotational speed upper limit of the prohibition area of second motor generator operation and Nmg2LL is a rotational speed lower limit Nmg2LL of the prohibition area of second motor generator operation.

Figure 12:
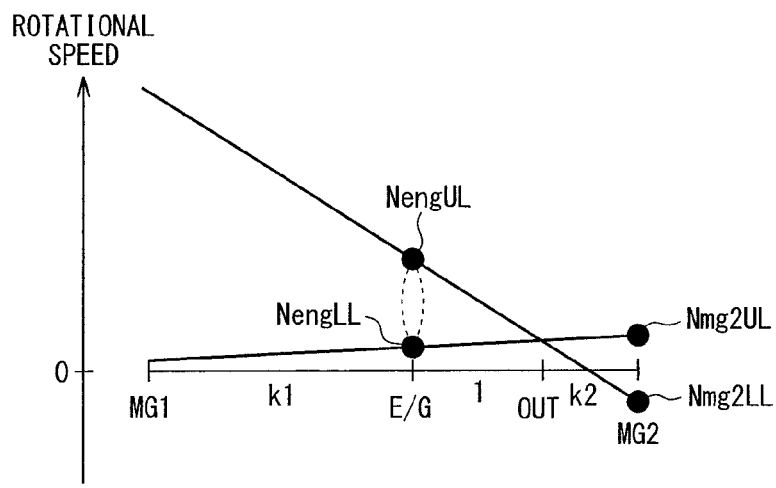
FIG. 12 is a diagram illustrating an upper speed limit and a lower speed limit of a prohibition area of first motor generator operation and an upper speed limit and a lower speed limit of a prohibition area of engine operation.

As is clear from FIG. 12, as engine speed Neng of engine 2 when second motor generator 5 turns at rotational speed upper limit Nmg2UL of the prohibition area of second motor generator operation is determined by vehicle speed Vc, the determined engine speed is engine speed lower limit NengLL of a prohibition area of engine operation and calculated from the following formula (5). In the formula, V1000 is the vehicle speed Vc when engine speed Neng of engine 2 is 1000 rpm.

$$NengLL = -Nmg2UL/k2 + ((k2+1) \times Vc \times 1000)/(k2 \times V1000) \quad (5).$$

Similarly, as engine speed Neng of engine 2 when second motor generator 5 turns at rotational speed lower limit Nmg2LL of the prohibition area of second motor generator operation is determined by vehicle speed Vc, the determined engine speed is engine speed upper limit NengUL of the prohibition area of engine operation and calculated from the following formula (6).

$$NengUL = -Nmg2LL/k2 + ((k2+1) \times Vc \times 1000)/(k2 \times V1000) \quad (6).$$

If, setting engine speed target Nengt between rotational speed lower and upper limits NengLL and NengUL, found from vehicle speed Vc, of the prohibition area of engine operation, such engine speed target Nengt is attained, vehicle vibration may take place due to torque ripple because second motor generator 5 turns at speed within the prohibition area of second motor generator operation. On the contrary, vehicle vibration due to torque ripple will not take place if the engine operates within areas other than the prohibition area of engine operation, and thus such areas other than the prohibition area of engine operation may be called "allowable areas of engine operation" because engine operation within these areas will not cause vehicle vibration due to torque ripple in second motor generator 5 to take place.

Figure 13:
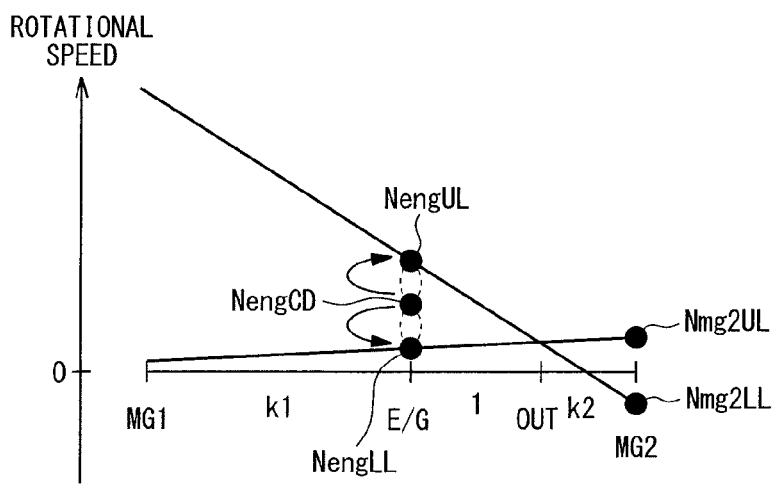
FIG. 13 is a diagram illustrating a change-direction engine speed, at which direction of shift to and from an allowable range of engine operation is changed, between the upper speed limit and lower speed limit of the prohibition area of engine operation.

Referring, now, to FIG. 13, this issue is attended by setting an intermediate value between the rotational speed lower and upper limits NengLL and NengUL of the prohibition area of engine operation as a change-direction engine speed NengCD at which direction of shift is changed toward the adjacent allowable area of engine operation, and when engine speed target Nengt is greater than or equal to the change-direction engine speed NengCD, engine speed target Nengt is corrected in an increasing direction toward rotational speed upper limit NengUL of the prohibition area of engine operation to provide an increase in engine speed Neng as described later in the routine. On the other hand, when engine speed target Nengt is less than the change-direction engine speed NengCD, engine speed target Nengt is corrected in a decreasing direction toward rotational speed lower limit NengLL of the prohibition area of engine operation to decrease engine speed Neng.

For example, given a shift from state where engine speed target Nengt is lower than the change-direction engine speed NengCD to state where engine speed target Nengt is equal to or higher than the change-direction engine speed NengCD, second motor generator rotational speed Nmg2 will pass through the prohibition area of second motor generator operation. It is permitted, on this occasion, to set, as the limited amount of change for the filtering to restrain rapid and frequent change in engine speed Neng, a larger value than usual, that is, a value larger than a value used when second motor generator rotational speed Nmg2 passes outside the prohibition area of second motor generator operation. This enables second motor generator rotational speed Nmg2 to pass through the prohibition area of second motor generator operation in a short time with good constraint on rapid change in engine speed Neng.

After compensating engine speed target Nengt in this way, engine torque target Tengt is reset in accordance with the above mentioned target operating line. Upon resetting engine speed target Nengt and engine torque target Tengt, engine power target Pengt is reset accordingly, then charge/discharge power temporary target Pbatr is calculated by subtracting it from driving power target Pdvt. When charge/discharge power temporary target Pbatr is greater than battery output limit PbatOL of battery 21, the battery output limit PbatOL is set as charge/discharge power target Pbatt, and engine torque target Tengt is reset again. On the other hand, when charge/discharge power temporary target Pbatr is less than battery input limit PbatIL, the charge/discharge power target Pbatt is set to battery input limit PbatIL, and engine torque target Tengt is reset again.

Figure 14:
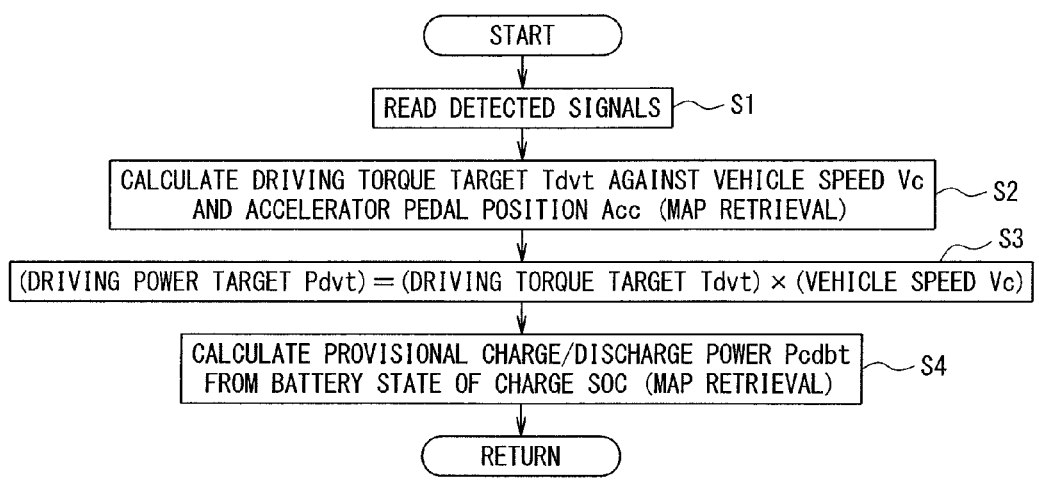
FIG. 14 is a flow chart representing routine performed by a drive-control controller shown in FIG. 1.

Referring to the flow chart shown in FIG. 14, a routine executed by said drive-control controller 32 is described, which constitutes portions of said driving torque target setting function 37, driving power target setting function 38 and charge/discharge power target setting function 39.

This routine may be executed, for example, in accordance with a processing strategy such as interrupt-driven using a timer to generate periodic interrupts, one upon elapse of a predetermined sampling time (for example, 10 msec.), and it is initiated with reading the detected signals from said accelerator pedal position sensor 33, driving speed sensor 34, engine speed sensor 35 and battery state of charge sensor 36 at step S1.

Figure 15:
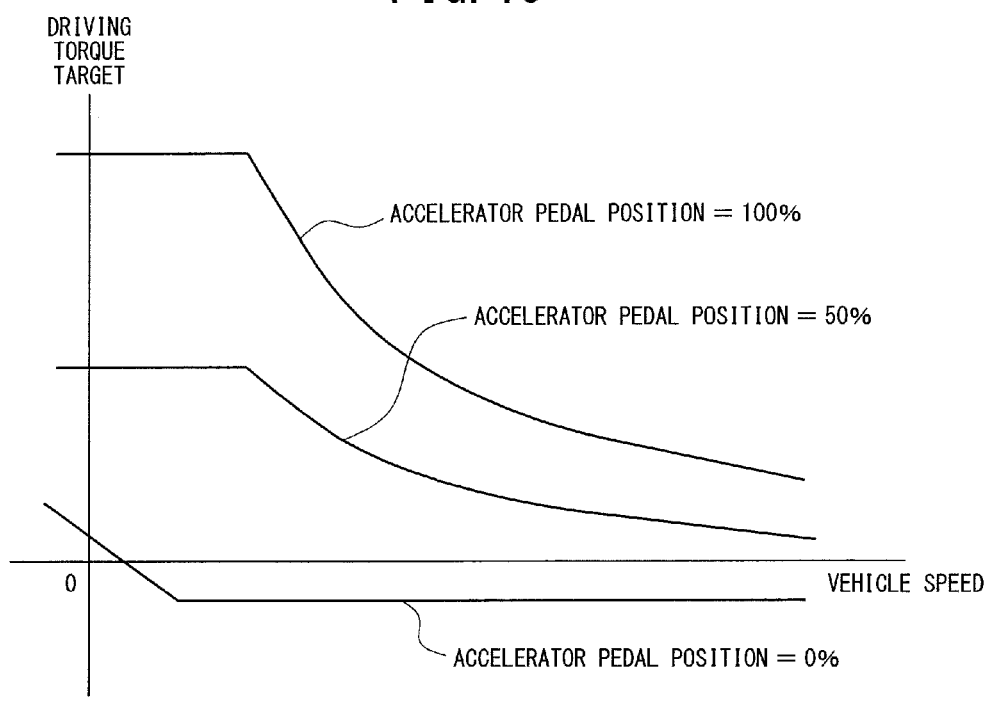
FIG. 15 is a control map used in the routine shown in FIG. 14.

Then, the routine proceeds to step S2, at which a driving torque target Tdvt responsible to the vehicle speed Vc and the accelerator pedal position Acc is calculated by retrieval of, for example, a map shown in FIG. 15 (constituting the drive torque target setting function 37).

Then, the routine proceeds to step S3, at which a driving power target Pdvt is calculated by multiplying the driving torque target Tdvt that has been calculated at said step S2 by vehicle speed Vc (constituting the driving power target setting function 38).

Figure 16:
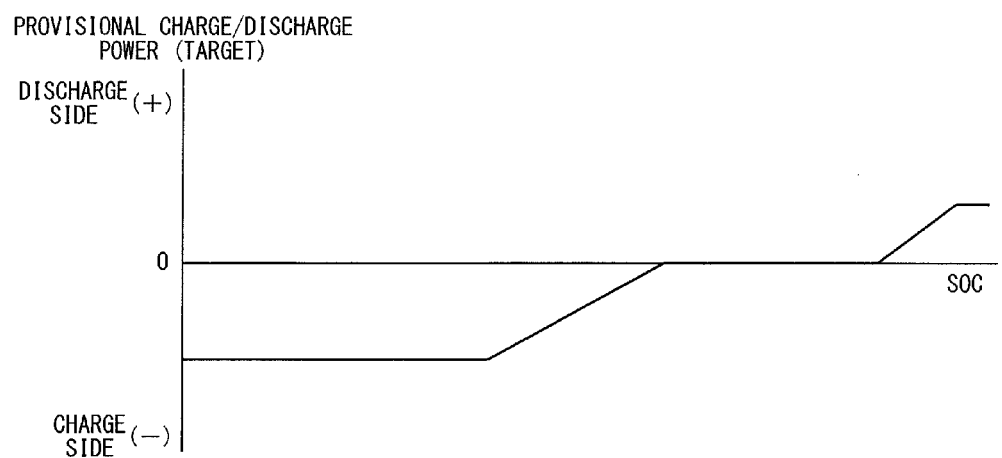
FIG. 16 is a control map used in the routine shown in FIG. 14.

Then, the routine proceeds to step S4, at which provisional charge/discharge power Pcdbt is calculated by retrieval of, for example, a map shown in FIG. 16 versus the battery state of charge SOC, and returns to main program.

Figure 17:
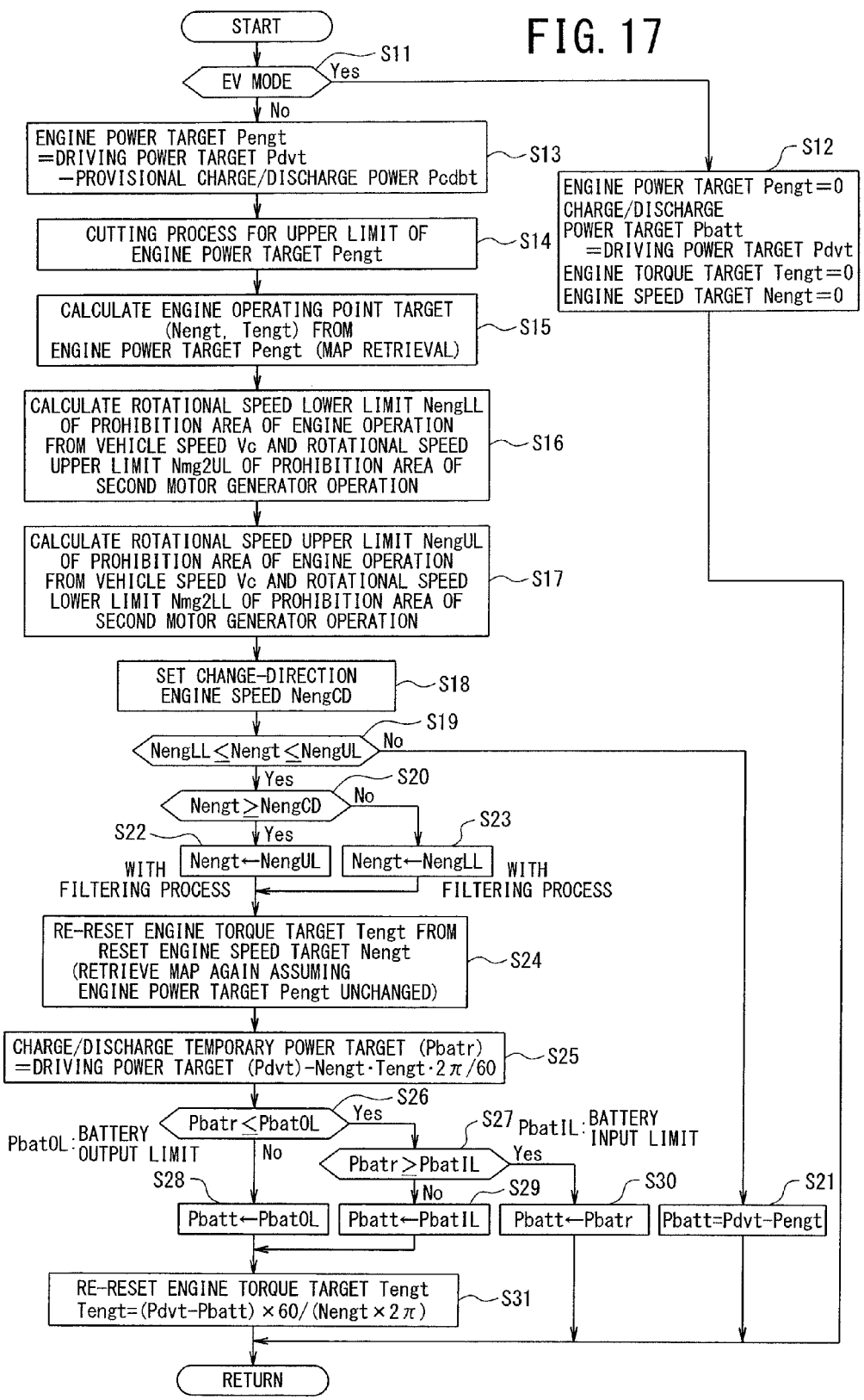
FIG. 17 is a flow chart representing routine performed by the drive-control controller shown in FIG. 1.

Referring to the flow chart shown in FIG. 17, a routine executed by said drive-control controller 32 is described, which constitutes said charge/discharge power target setting function 39, engine power target setting function 40 and engine control function 41. This routine may be executed immediately after execution of the routine shown in FIG. 14, for example, in accordance with a processing strategy such as interrupt-driven using a timer to generate periodic interrupts, one upon elapse of predetermined sampling time (for example, 10 msec.); and it is initiated with determining at step S11 whether or not the vehicle operates in a drive mode where only one or both of first motor generator 4 and second motor generator 5 drive the vehicle (indicated at "EV mode" in the figure, hereinafter called "motor-generator drive mode"); and the routine proceeds to step S12 if the vehicle operates in motor-generator drive mode or otherwise the routine proceeds to step S13. Drive mode in which only one or both of first motor generator 4 and second motor generator 5 are activated, i.e. motor-generator drive mode, is established when engine power target Pengt is 0, for example, when battery 21 is almost fully charged, so that temporary charge/discharge power Pcdbt calculated based on battery state of charge SOC is greater than or equal to driving power target Pdvt or when, with accelerator pedal released, the vehicle creeps or coasts or decelerates unless battery 21 is almost fully charged.

At the above mentioned step S12, the vehicle is in motor-generator drive mode, so that engine power target Peng is set to 0, charge/discharge power target Pbatt to driving power target Pdvt, engine torque target Tengt to 0 and engine speed target Nengt to 0, respectively, before the routine returns to the main program. Even in such a case, a filter may be used to process engine speed Neng by limiting the amount of change in engine speed target Nengt.

On the other hand, at the above mentioned step S13, engine power target Pengt is calculated by subtracting provisional charge/discharge power Pcdbt that is calculated at step S4 from driving power target Pdvt that is calculated at said step S3 (constituting engine power target setting function 40).

Next, the routine proceeds to step S14 at which engine power target Pengt is subject to upper limit cut-off process (constituting engine power target setting function 40). This upper limit is the maximum of engine power which engine 2 can provide.

Next, the routine proceeds to step S15 at which that engine power target Pengt which is subject to upper limit cut-off process at the above mentioned step S14 is used for retrieval of a map shown in FIG. 11 to calculate target engine operating point, i.e. engine speed target Nengt and engine torque target Tengt (hereinafter, constituting engine control function 41).

Next, the routine proceeds to step S16, and rotational speed lower limit NengLL of the prohibition area of engine operation is calculated, subject to said equation (5), according to said vehicle speed Vc and rotational speed upper limit Nmg2UL of the prohibition area of second motor generator operation.

Next, the routine proceeds to step S17, at which upper rotational speed upper limit NengUL of the prohibition area of engine operation is calculated, subject to said equation (6), in response to said vehicle speed Vc and rotational speed lower limit Nmg2LL of the prohibition area of second motor generator operation.

Next, the routine proceeds to step S18, at which the change-direction engine speed NengCD is calculated, for example, from an intermediate value between rotational speed lower limit NengLL of the prohibition area of engine operation and rotational speed upper limit NengUL of the prohibition area of engine operation.

Next, the routine proceeds to step S19, at which it is determined whether or not engine speed target Nengt calculated at said step S15 is greater than or equal to the rotational speed lower limit NengLL of the prohibition area of engine operation and less than or equal to the rotational speed upper limit NengUL of the prohibition area of engine operation. If the engine speed target Nengt is greater than or equal to the rotational speed lower limit NengLL of the prohibition area of engine operation and less than or equal to the rotational speed upper limit NengUL of the prohibition area of engine operation, the routine proceeds to step S20, and if not, it proceeds to step S21.

At said step S21, charge/discharge power target Pbatt is calculated by subtracting the engine power target Pengt, as processed at said step S14 to cut off portion above the upper limit, from driving power target Pdvt calculated at said step S3 (constituting charge/discharge power target setting function 39), and the routine return to the main program. In this case, the engine speed target Nengt and engine torque target Tengt, which are calculated at step S15, are set as target values without any compensation.

On the other hand, at said step S20, it is determined whether or not said engine speed target Nengt is greater than or equal to the change-direction engine speed NengCD, and if said engine speed target Nengt is greater than or equal to the change-direction engine speed NengCD, the routine proceeds to step S22, and if not, it proceeds to step S23.

After setting engine speed target Nengt again to rotational speed upper limit NengUL of the prohibition area of engine operation (compensation) at step S22, the routine proceeds to step S24. At the time of this compensation of engine speed target Nengt, filtering may be performed in the above described manner using the limited amount of change. On this occasion, the limited amount of change may be set to a value larger than usual, that is, than a value used when second motor generator rotational speed Nmg2 passes through the other areas of the prohibition area of second motor generator operation, so that it takes a shorter time for second motor generator rotational speed Nmg2 to pass through the prohibition area of second motor generator operation with constraint on rapid and frequent change in engine speed Neng. Accordingly, it can also be said that this step S22 corrects engine speed target Nengt in a direction toward a value of rotational speed upper limit NengUL of the prohibition area of engine operation.

Further, after setting engine speed target Nengt again to rotational speed lower limit NengLL of the prohibition area of engine operation (compensation) at step S23, the routine proceeds to step S24. At the time of this correction of engine speed target Nengt, filtering may be performed in the above described manner using the limited amount of change. On this occasion, the limited amount of change may be set to a value larger than usual, that is, than a value used when second motor generator rotational speed Nmg2 passes through the other areas of the prohibition area of second motor generator operation, so that it takes a shorter time for second motor generator rotational speed Nmg2 to pass through the prohibition area of second motor generator operation with constraint on rapid change in engine speed Neng. Accordingly, it can also be said that this step S23 corrects engine speed target Nengt in a direction toward a value of rotational speed lower limit NengLL of the prohibition area of engine operation.

At said step S24, engine torque target Tengt is set again to a suitable value for engine power target Pengt by retrieving again the control map of FIG. 11 using that engine speed target Nengt which is reset at said step S22 or step S23. That is, it can be said that this step S24 corrects engine operating point target in such a way as to approach target operating line which is set beforehand to improve the efficiency.

Next, the routine proceeds to step S25, at which charge/discharge power temporary target Pbatr is calculated in accordance with the following equation (7) using the reset engine speed target Nengt and engine torque target Tengt (constituting charge/discharge power target setting function 39), $$Pbatr = Pdvt - Nengt \times Tengt \times 60/2\pi \quad (7).$$

Next, the routine proceeds to step S26, at which it is determined whether or not charge/discharge power temporary target Pbatr calculated at said step S25 is less than or equal to battery output limit PbatOL obtained, for example, from the battery charge state SOC, and if the charge/discharge power temporary target Pbatr is less than or equal to battery output limit PbatOL, the routine proceeds to step S27, and if not, it proceeds to step S28.

At step S27, it is determined whether or not charge/discharge power temporary target Pbatr calculated at step S25 is greater than or equal to battery input limit PbatIL obtained, for example, from battery charge state SOC, and if the charge/discharge power temporary target Pbatr is greater than or equal to battery input limit PbatIL, the routine proceeds to step S30, and if not, it proceeds to step S29.

After setting, at step S30, charge/discharge power target Pbatt to said charge/discharge power temporary target Pbatr, the routine returns to the main program (constituting charge/discharge power target setting function 39).

On the other hand, after setting, at step S28, charge/discharge power target Pbatt to said battery output limit PbatOL, the routine proceeds to step S31 (constituting charge/discharge power target setting function 39).

Further, after setting, at step S29, charge/discharge power target Pbatt to said battery input limit PbatIL, the routine proceeds to step S31 (constituting charge/discharge power target setting function 39).

Then, after re-resetting, at said step S31, engine torque target Tengt in accordance with the following equation (8), the routine returns to the main program. In this case, the engine speed target Nengt as set at step S22 or step S23 is used as it is. Accordingly, it can be said that this step S31 sets engine torque target Tengt so that it lies within a permissible range of input to or output from battery 21.

$$Tengt = (Pdvt - Pbatt) \times 60/(Nengt \times 2\pi) \quad (8).$$

In addition, engine control function 41 controls conditions of air intake via mass air flow adjustment unit 10, conditions of admission of fuel via fuel admission system 11 and conditions of igniting fuel via ignition manager 12 in order to achieve the engine speed target Nengt and engine torque target Tengt which have been set.

Figure 18:
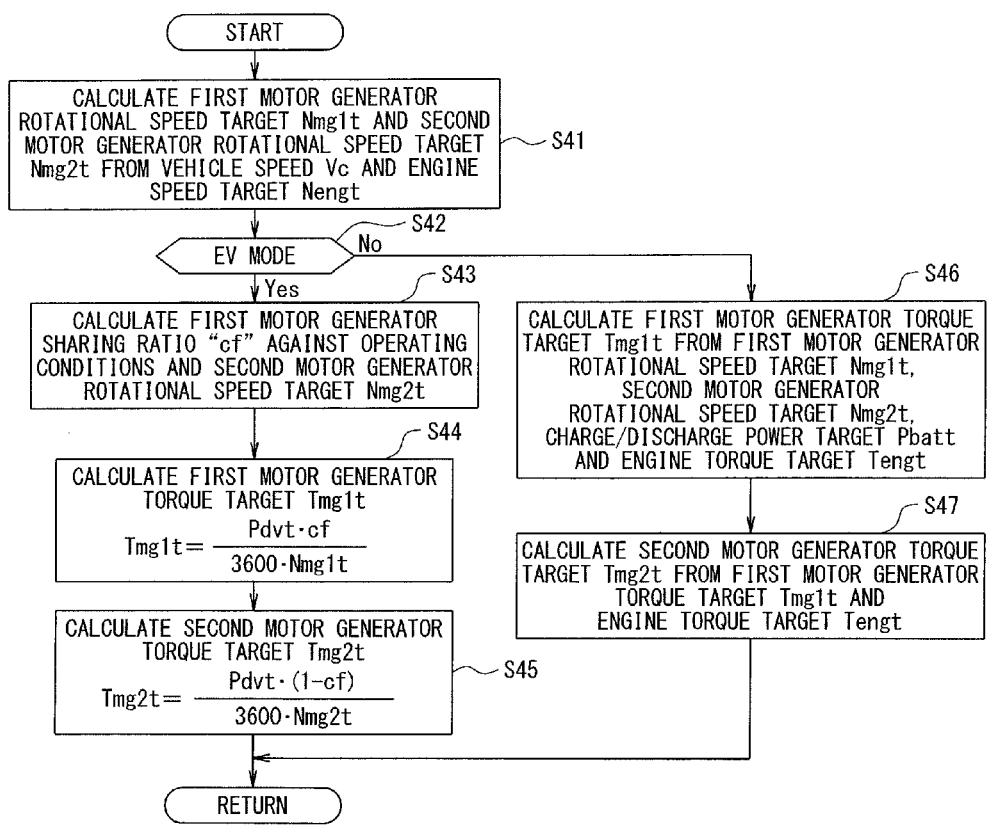
FIG. 18 is a flow chart representing routine performed by the drive-control controller shown in FIG. 1.

Referring to the flow chart shown in FIG. 18, a routine, which is executed in said drive-control controller 32 and constitutes said motor generator control function 42, is described. This routine may be executed immediately after execution of the routine shown in FIG. 17, for example, in accordance with a processing strategy such as interrupt-driven using a timer to generate periodic interrupts, one upon elapse of a predetermined sampling time (for example, 10 msec.); and it is initiated with calculating, at step S41, a first motor-generator speed target Nmg1t and a second motor-generator speed target Nmg2t from vehicle speed Vc and engine speed target Nengt. For this calculation, the following equations 1' and 2', which are derived from said equations 1 and 2, respectively, are used. As described before, the output rotational speed Nout that is used in the equations is derived from the vehicle speed Vc, the final reduction ratio and the reduction ratio of output gearing 31.

$$Nmg1t = (Nengt - Nout) \times k1 + Nengt \quad (1')$$

$$Nmg2t = (Nout - Nengt) \times k2 + Nout \quad (2')$$

Next, the routine proceeds to step S42 in which it is determined whether or not the vehicle operates in said motor-generator drive mode ("EV mode" in the figure), and the routine proceeds to step S43 if the vehicle operates in motor-generator drive mode or otherwise the routine proceeds to step S46. The determination that the vehicle operates in motor generator mode is the same as that at step S11 of the routine shown in FIG. 17.

At step S43, first motor generator sharing ratio "cf" is calculated in response to driving conditions of the vehicle and second motor generator rotational speed target Nmg2t as described before, and the routine proceeds, next, to step S44.

At step S44, first motor generator torque target Tmg1t is calculated, in accordance with the following equation 9, from driving power target Pdvt, first motor generator sharing ratio "cf" and first motor generator rotational speed target Nmg1t, before the routine proceeds to step S45.

$$Tmg1t = (Pdvt \times cf)/(3600 \times Nmg1t) \quad (9).$$

At step S45, second motor generator torque target Tmg2t is calculated, in accordance with the following equation 10, from driving power target Pdvt, first motor generator sharing ratio "cf" and second motor generator rotational speed target Nmg2t, before the routine returns to the main program.

$$Tmg2t = (Pdvt \times (1 - cf))/(3600 \times Nmg2t) \quad (10).$$

On the other hand, at step S46, first motor generator torque target Tmg1t is calculated, in accordance with the following equation 11, from first motor generator rotational speed target Nmg1t, second motor generator rotational speed target Nmg2t, charge/discharge power target Pbatt and engine torque target Tengt before the routine proceeds to step S47. The following equation 11 is derived from modifying the simultaneous equations 3 and 4.

$$Tmg1t=(Pbatt\times 60/2\pi-Nmg2t\times Tengt/k2)/(Nmg1t+Nmg2t\times(1+k1)/k2) \quad (11).$$

At step S47, second motor generator torque target Tmg2t is calculated, in accordance with the following equation 12, from first motor generator torque target Tmg1t and engine torque target Tengt, before the routine returns to the main program. The following equation 12 is derived from said equation 3.

$$Tmg2t=(Tengt+(1+k1)\times Tmg1t)/k2 \quad (12).$$

According to the routine shown in said FIG. 14, drive torque target Tdvt, which reflects driver demand and driving condition, is set in accordance with vehicle speed Vc and accelerator pedal position Acc, driving power target Pdvt is calculated by multiplying the drive torque target Tdvt and the vehicle speed Vc, and, on the other hand, provisional charge/discharge power Pcdbt, which corresponds to the state of charge SOC of battery 21, is set.

Turning, now, to the routine shown in said FIG. 17, if the motor generator drive mode is not the case, engine power target Pengt is calculated by subtracting provisional charge/discharge power Pcdbt from driving power target Pdvt, and engine speed target Nengt and engine torque target Tengt are calculated by probing the map illustrated in said FIG. 11 using engine power target Pengt that has been subject to upper limit cut-off process. If this engine speed target Nengt is less than rotational speed lower limit NengLL of the prohibition area of engine operation or greater than rotational speed upper limit NengUL of the prohibition area of engine operation, charge/discharge power target Pbatt is calculated by subtracting engine power target Pengt subject to upper limit cut-off process from driving power target Pdvt. Engine operating conditions to realize good overall vehicle efficiency may be realized upon achieving engine speed target Nengt and engine torque target Tengt by letting the engine control function 41 control conditions of air intake via mass air flow adjustment unit 10, conditions of admission of fuel via fuel admission system 11 and conditions of igniting fuel via ignition manager 12.

Since, under the above-mentioned operating conditions, the engine 2 is operating, the routine shown in FIG. 18 proceeds from step S41 to step S46; and first motor generator rotational speed target Nmg1 and second motor generator rotational speed target Nmg2t are set in response to vehicle speed Vc and engine speed target Nengt. At step S46 and step S47, first motor generator torque target Tmg1t and second motor generator torque target Tmg2t are set so that they may satisfy the torque balance equation expressed by said equation 3 and the electricity balance equation expressed by equation 4. Therefore, the motor generator control function 42 controls first inverter 19 and second inverter 20, causing first motor generator 4 to turn at first motor generator rotating speed target Nmg1 to generate torque at first motor generator torque target Tmg1t, causing second motor generator 5 to turn at second motor generator rotating speed target Nmg2 to generate torque at second motor generator torque target Tmg2t. This realizes operating conditions of the motor generators with good torque balance and electricity balance and with good overall vehicle efficiency.

On the contrary, under the operating conditions of the vehicle when the engine 2 is not in operation, since the motor generator drive mode is selected, only one or both of first motor generator 4 and second motor generator 5 are required to drive the vehicle. As engine power target Pengt at this time is 0, one of or both of first motor generator 4 and second motor generator 5 are required to make up for driving power target Pdvt in its entirety. In this case, responsive to vehicle operating conditions and second motor generator rotational speed target Nmg2t, first motor generator sharing ratio "cf" is set, so that, using this ratio, first motor generator torque target Tmg1t and second motor generator torque target Tmg2t are calculated and set at step S44 and step S45. Therefore, motor generator control function 42 controls first inverter 19 and second inverter 20, causing first motor generator 4 to turn at first motor generator rotating speed target Nmg1 to generate torque at first motor generator torque target Tmg1t, causing second motor generator 5 to turn at second motor generator rotating speed target Nmg2 to generate torque at second motor generator torque target Tmg2t. This realizes operating conditions of the motor generators with good efficiency in motor generator drive mode.

Figure 19:
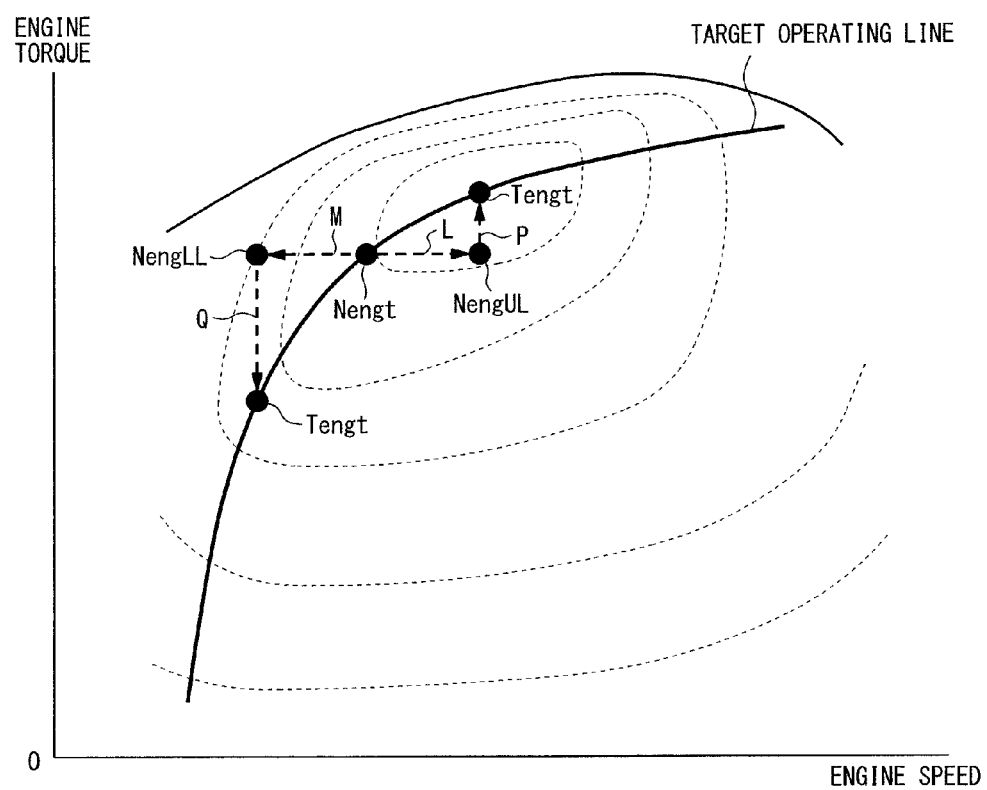
FIG. 19 is an engine characteristic diagram illustrating the effect of the routine shown in FIG. 17.

On the other hand, with engine 2 in operation, if engine speed target Nengt is greater than or equal to engine rotational speed lower limit NengLL of the prohibition area of engine operation and less than or equal to engine rotational speed upper limit NengUL of the prohibition area of engine operation, it is determined whether or not engine speed target Nengt is greater than or equal to the change-direction engine speed NengCD. If, now, engine speed target Nengt is greater than or equal to the change-direction rotational speed NengCD, engine speed target Nengt is corrected in one direction of increasing its value toward the rotational speed upper limit NengUL of the prohibition area of engine operation as shown by the illustrated arrow L in FIG. 19. If engine speed target Nengt is less than the change-direction rotational speed NengCD, engine speed target Nengt is corrected in the opposite direction of decreasing its value toward the rotational speed lower limit NengLL of the prohibition area of engine operation as shown by the illustrated arrow M in FIG. 19. Further, if engine speed target Nengt is corrected in the direction of increasing its value to the rotational speed upper limit speed NengUL of the prohibition area of engine operation, engine torque target Tengt is reset under restraint of the target operating line shown in FIG. 19 to a value indicated by the illustrated arrow P. If, next, engine speed target Nengt is corrected in the direction of decreasing its value to the rotational speed lower limit NengLL of the prohibition area of engine operation, engine torque target Tengt is reset under restraint of the target operating line shown in FIG. 19 to a value indicated by the illustrated arrow Q. With the engine speed target Nengt as corrected and the engine torque target Tengt as reset in above-mentioned manner, second motor generator rotational speed Nmg2 of second motor generator 5 no longer lies in the prohibition area of second motor generator operation, restraining and preventing torque ripple of second motor generator 5 to make it possible to restrain and prevent vehicle vibration.

Figure 20:
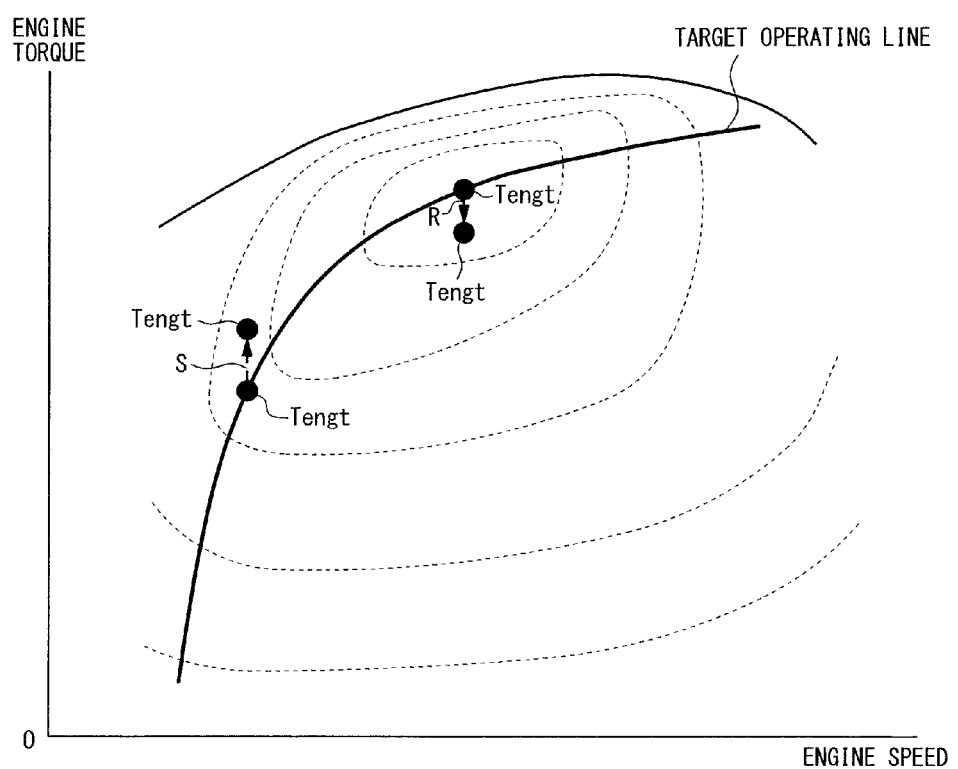
FIG. 20 is an engine characteristic diagram illustrating the effect of the routine shown in FIG. 17.

Further, charge/discharge power temporary target Pbatr is calculated from the reset engine speed target Nengt and engine torque target Tengt; and if charge/discharge power target Pbatr is greater than battery output limit PbatOL, the battery output limit PbatOL is used to set charge/discharge power target Pbatt; and the charge/discharge power target Pbatt is used to re-reset engine torque target Tengt to a value as indicated by the illustrated arrow R in FIG. 20. If, on the other hand, the calculated charge/discharge power temporary target Pbatr is less than battery input limit PbatIL, the battery input limit PbatIL is used to set charge/discharge power target Pbatt, and this charge/discharge power temporary target Pbatt is used to re-reset engine torque target Tengt to a value as indicated by the illustrated arrow S in FIG. 20. This may restrain and prevent vehicle vibration due to torque ripple of second motor generator, while keeping input/output power to and from battery 21 within input/output permissible range because it is determined whether or not input/output power request to and from battery 21 falls in input/output permissible range, and if it is determined that the input/output power request lies outside the input/output permissible range, engine torque target Tengt is set with constraints imposed by the input/output permissible range of battery 21.

For control of operating conditions of engine 2, first motor generator 4 and second motor generator 5 in drive control apparatus for hybrid electric vehicle according to the present embodiment, if second motor generator rotational speed Nmg2 of second motor generator 5 is about to fall in the prohibition area of second motor generator operation, which is set in the neighborhood of 0 rpm when the vehicle is in motion, the engine operating point target, which is defined by a set of engine speed target Nengt and engine torque target Tengt, is corrected so that second motor generator rotational speed Nmg2 of second motor generator 5 remains outside the prohibition area. This restrains and prevents vehicle vibration due to torque ripple because of restraining and preventing a situation that torque ripple may occur when second motor generator rotational speed Nmg2 of second motor generator 5 lies in the neighborhood of 0 rpm.

Further, rotational speed upper limit NengUL and rotational speed lower limit NengLL of the prohibition area of engine operation are set from rotational speed upper limit Nmg2UL and rotational speed lower limit Nmg2LL of the prohibition area of second motor generator operation set beforehand. If it is determined that engine rotational speed target Nengt, which has been determined from the target operating line, lies in the prohibition area of engine operation, engine operating point target is corrected so that second motor generator speed target Nmg2t remains outside of the prohibition area of second motor generator operation. This may restrain and prevent vehicle vibration due to torque ripple by second motor generator 5 despite operating condition request on second motor generator 5.

Further, for correction of engine operating point target, engine operating point target is corrected in such a way that gets closer the preset target operating line to improve efficiency of engine and powertrain. This may restrain and prevent vehicle vibration due to torque ripple of second motor generator 5, while restraining and preventing fuel consumption deterioration.

Further, for correction of engine operating point, it is determined whether or not input/output power request on battery 21 lies within the permissible range determined by battery state of charge SOC, and if input/output power request on battery 21 lies outside the permissible range, engine torque target Tengt is set with constraints imposed by the input/output permissible range of battery 21. This may restrain and prevent vehicle vibration due to torque ripple of second motor generator 5, while keeping proper input/output to and from battery 21.

Further, setting change-direction rotational speed NengCD between rotational speed upper limit NengUL and rotational speed lower limit NengLL of the prohibition area of engine operation, if engine speed target Nengt is greater than or equal to change-direction rotational speed NengCD, engine speed target Nengt is corrected in one direction of increasing engine speed Neng. If engine speed target Nengt is less than change-direction rotational speed NengCD, engine speed target Nengt is corrected in the opposite direction of decreasing engine speed Neng. This enables correction of engine speed target Nengt to a value closer to that engine speed target Nengt which has been calculated from target operating line.

Further, with engine speed target Nengt varying at a rate not to exceed a preset limited amount of change, the limited amount of change takes on a value larger than a value upon second motor generator rotational speed Nmg2 passing through outside the prohibition area of second motor generator operation when second motor generator rotational speed Nmg2 passes through the prohibition area of second motor generator operation. This shortens time it takes for second motor generator rotational speed Nmg2 to pass through the prohibition area of second motor generator operation with constraint on rapid change in engine speed Neng.

The connecting configuration of four rotational elements (shafts) of power split and composition device is not limited to the one described above, various connecting forms are to be included, for example, as mentioned in said JP Patent No. 3852562 which the applicant previously proposed. The drive control apparatus for hybrid electric vehicle according to the present invention may achieve the same effect even on a hybrid vehicle with such connecting configuration forms.

Furthermore, the form of a drive control for an engine, first and second motor generators is not limited to the one described above, it is possible to use various kinds of forms of hybrid control systems, and the drive control apparatus of the present invention may obtain the same operation and effect in the drive mode in which the engine and motor generators operate concurrently.

Furthermore, the drive control apparatus for hybrid vehicle of the present invention can obtain the same operation and effect on the hybrid vehicles with onboard motors which do not function as generators as well as an engine. In this case, the number of the onboard motors should be more than one.

DESCRIPTION OF NOTATIONS

1 One-way clutch
2 Engine
3 Engine output shaft
4 First motor generator
5 Second motor generator
6 Traction wheel
7 Traction shaft
8 First planetary gear set
9 Second planetary gear set
19 First inverter
20 Second inverter
21 Battery
32 Drive-control controller (drive control function)
37 Driving torque target setting function
38 Driving power target setting function
39 Charge/discharge power target setting function
40 Engine power target setting function
41 Engine control function
42 Motor generator control function.

The invention claimed is:

1. A drive control apparatus for a hybrid electric vehicle, which is driven, via a powertrain, by using the output of an engine and the output of a motor operable on power supplied by a battery, comprising:
 a drive control arrangement configured to correct an engine operating point target defined by an engine speed target and an engine torque target such that, when a rotational speed of said motor comes to lie in a prohibition area of motor operation that is a predetermined range in the neighborhood of 0 rpm of the rotational speed of said motor while driving the vehicle by controlling operating conditions of said engine and motor, the drive control arrangement corrects the engine operating point target so that the rotational speed of the motor lies outside the prohibition area of motor operation;

wherein a prohibition area of engine operation includes an engine rotational speed upper limit and an engine rotational speed lower limit, and wherein a shift direction changing engine speed is set in the drive control arrangement, and further wherein the shift direction changing engine speed is between the engine rotational speed upper limit and the engine rotational speed lower limit; and wherein when the engine speed target is within said prohibition area of engine operation, said drive control arrangement corrects the engine speed target to increase engine speed when said engine speed target is greater than or equal to the shift direction changing engine speed or to decrease engine speed when said engine speed target is less than the shift direction changing engine speed.

2. The drive control apparatus for hybrid electric vehicle, according to claim 1, wherein the engine speed target, is first calculated from a preset target operating line, wherein the engine rotational speed upper limit and the engine rotational speed lower limit of the prohibition area of engine operation are set from a motor rotational speed upper limit and a motor rotational speed lower limit of said prohibition area of motor operation, and wherein when said engine speed target lies in said prohibition area of engine operation, said drive control arrangement is configured to correct the engine operating point target such that a rotational speed target of said motor lies outside said prohibition area of motor operation.

3. The drive control apparatus according to claim 2, wherein:
in the event that said engine operating point target is corrected, said drive control arrangement corrects said engine operating point target in such a way that said engine operating point gets closer to said preset target operating line to improve efficiency of said engine and efficiency of said powertrain.

4. The drive control apparatus for hybrid electric vehicle according to claim 1, wherein:
in the event that said engine operating point target is corrected, upon determining that input/output power of the battery is out of a permissible range variable depending on the state of charge of the battery after determining whether or not the input/output power of the battery is in the permissible range, said drive control arrangement sets the engine torque target such that the input/output power of the battery lies in the permissible range of input/output power of said battery.

5. The drive control apparatus for hybrid electric vehicle according to claim 2, wherein:
said drive control arrangement limits speed change to a limited amount of change value during a change of speed which is outside of said prohibition area of motor operation, and wherein said drive control arrangement allows a speed change greater than said limited amount of speed change value for a speed change passing through said prohibition area of motor operation.

6. The hybrid electric vehicle drive control apparatus according to claim 2, further including a drive assembly comprising:
a power split and composition device with four shafts in driving connection with rotating elements of each of two planetary gear sets;
said motor and another motor coupled to the battery; and
wherein said four shafts of the power split and composition device are connected to said another motor, said engine, a traction shaft connected to a traction wheel and said motor, respectively, so that said another motor, said engine, said traction shaft and said motor are arranged in this order on a collinear diagram from one side thereof; and
wherein said drive control arrangement controls operating conditions of said engine in response to an engine power target derived from a driving power target required for the vehicle, and at the same time, controls operating conditions of said motor and the another motor in response to a charge/discharge power target calculated by subtracting the engine power target from said driving power target.

7. A hybrid electric vehicle comprising the drive control apparatus according to claim 2.

8. A hybrid electric vehicle comprising the drive control apparatus according to claim 6.

9. The drive control apparatus according to claim 1, wherein the engine speed target is first determined from a preset target operating line, and wherein after correcting of the engine speed target by the drive control arrangement, the drive control arrangement resets an engine torque target based on the preset target operating line.

10. The drive control apparatus according to claim 1, wherein the drive control arrangement calculates the engine rotational speed upper limit based upon vehicle speed and a motor speed lower limit value, and said drive control arrangement calculates the engine rotational speed lower limit based on vehicle speed and a motor rotational speed upper limit value.

11. The drive control apparatus according to claim 10, wherein the drive control arrangement determines the change direction engine speed based on the engine rotational speed upper limit and the engine rotational speed lower limit.

* * * * *